(12) United States Patent
Guenter

(10) Patent No.: US 7,671,860 B2
(45) Date of Patent: Mar. 2, 2010

(54) REPRESENTING IMPLICIT CURVES OF PROCEDURAL GEOMETRIC SURFACES

(75) Inventor: Brian K. Guenter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 11/213,553

(22) Filed: Aug. 26, 2005

(65) Prior Publication Data

US 2006/0101103 A1 May 11, 2006

Related U.S. Application Data

(63) Continuation-in-part of application No. 10/977,731, filed on Oct. 28, 2004.

(51) Int. Cl.
G06T 11/20 (2006.01)
(52) U.S. Cl. ..................... 345/442; 345/441
(58) Field of Classification Search ................. 345/441, 345/442
See application file for complete search history.

(56) References Cited

U.S. PATENT DOCUMENTS

| 6,100,893 | A  | 8/2000  | Ensz et al.     |
|-----------|----|---------|-----------------|
| 6,285,372 | B1 | 9/2001  | Cowsar et al.   |
| 6,300,958 | B1 | 10/2001 | Mallet          |
| 6,356,263 | B2 | 3/2002  | Migdal et al.   |
| 6,525,727 | B1 | 2/2003  | Junkins et al.  |
| 6,806,875 | B2 | 10/2004 | Nakatsuka et al.|
| 2002/0171643 | A1 | 11/2002 | Ernst et al. |
| 2003/0174133 | A1 | 9/2003  | Shehane et al. |
| 2004/0114794 | A1 | 6/2004  | Vlasic et al. |
| 2004/0263516 | A1 | 12/2004 | Michaili et al. |

FOREIGN PATENT DOCUMENTS

KR    2005-44964 A    5/2005

(Continued)

OTHER PUBLICATIONS

Bartels et al., "An introduction to splines for use in computer graphics & geometric modeling", "Hermite and Cubic Spline Interpolation." Ch. 3 in An Introduction to Splines for Use in Computer Graphics and Geometric Modelling. San Francisco, CA: Morgan Kaufmann, pp. 9-17, 1998.*

(Continued)

Primary Examiner—Ulka Chauhan
Assistant Examiner—Jeffrey J Chow
(74) Attorney, Agent, or Firm—Klarquist Sparkman, LLP

(57) ABSTRACT

Compact and accurate piecewise parametric representations of implicit curves may be achieved by iteratively selecting ranges of parameterizing regions and testing each for satisfying an intervalized super convergence test. In one aspect, the implicit curves is represented as a compact form of one or more representations of such convergence regions. For memory and bandwidth constrained applications, starting points of convergence regions may not be stored but instead calculated at runtime prior to rendering a point on the implicit curve. Furthermore, not all endpoints relevant convergence regions of a selected implicit curve need be stored. Instead, based on at least one endpoint, the other endpoints can be derived via Newton iterations. To further reduce memory and bandwidth costs, coordinates can be stored in a quantized format and the points reflecting floating point accuracy can be derived at runtime again by Newton iteration.

20 Claims, 20 Drawing Sheets

FOREIGN PATENT DOCUMENTS

WO   WO 2004-044689 A2   5/2004

OTHER PUBLICATIONS

Sederberg et al., "Geometric Hermite approximation of surface patch intersection curves", Elsevier Science Publishers B.V., 1991.*

Bühler, "Implicit Linear Interval Estimations", *Proceedings Of The 18th Spring Conference On Computer Graphics*, Apr. 24-27, 2002, Budmerice, Slovakia.

Duff, "Interval Arithmetic and Recursive Subdivision for Implicit Functions and Constructive Solid Geometry", *ACM Siggraph Computer Graphics, Proceedings of the 19th Annual Conference on Computer Graphics and Interactive Techniques*, vol. 26, Issue 2, p. 131-138, Jul. 1992.

Krishnan et al., An Efficient Surface Intersection Algorithm Based on Lower-Dimensional Formulation, *ACM Transactions On Graphics (TOG)*, vol. 16, Issue 1, Jan. 1997, 74-106.

Ponamgi et al., "Incremental Algorithms for Collision Detection Between Solid Models", *Proceedings of The Third ACM Symposium On Solid Modeling And Applications*, p. 293-304, May 17-19, 1995, Salt Lake City, Utah, United States.

Snyder et al., "Generative Modeling: A Symbolic System for Geometric Modeling", California Institute of Technology from *Proceedings of SIGGRAPH 1992*, Association for Computing Machinery Special Interest Group on Computer Graphics (ACM SIGGRAPH), vol. 26, Issue 2, Jul. 1992, p. 369-378.

Snyder et al., "Interval Methods For Multi-Point Collisions Between Time-Dependent Curved Surfaces", *Proceedings Of The 20th Annual Conference On Computer Graphics And Interactive Techniques*, p. 321-334, Sep. 1993.

Snyder, "Interval Analysis for Computer Graphics", *ACM SIGGRAPH Computer Graphics, Proceedings of the 19th Annual Conference on Computer Graphics and Interactive Techniques*, vol. 26, Issue 2, Jul. 1992.

Gottschalk et al., "OBBTree: A Hierarchical Structure For Rapid Interference Detection," *Proceedings Of The 23rd Annual Conference On Computer Graphics And Interactive Techniques*, 1996, pp. 171-180.

Gutierrez et al., "Newton's method under weak Kantorovich conditions," *IMA Journal of Numerical Analysis*, vol. 20, 2000, pp. 521-532.

Hernandez, "A modification of the classical Kantorovich conditions for Newton's method," *Journal of Computational and Applied Mathematics*, vol. 137, 2001, pp. 201-205.

International Search Report from PCT/US06/25413 dated Feb. 15, 2007, 7 pages.

International Search Report from PCT/US2006/032227 dated Dec. 28, 2006, 3 pages.

Kramer, "The Iterative Determination of Model Parameters by Newton's Method," *General Electric Company*, Sep. 1967, pp. 1-12.

Matthews, "Module for Fixed Point Iteration and Newton's Method in 2D and 3D," http://math.fullerton.edu/mathews/n2003/FixPointNewtonMod.html, Mar. 14, 2004, 9 pages.

Nataraj et al., "A New Super-Convergent Inclusion Function Form and its Use in Global Optimization," *SIAM Workshop on Validated Computing*, May 2002, pp. 1-9.

Wiethoff, "Interval Newton Method," http://rz.uni-karlsruhe.del-am/htmlllanguage/cxsc/node12.html, Mar. 29, 1995, 2 pages.

Wikipedia, "Invertible Matrix," http://en.wikipedia.orglwiki/Singular_matrix, Jul. 31, 2004, 7 pages.

Zlepko et al., "An Application of a Modification of the Newton-Kantorovich Method to the Approximate Construction of Implicit Functions," Ukrainskii Matematicheskii Zhurnal, vol. 30, No. 2, Mar.-Apr. 1978, pp. 222-226.

Argyros, "On the comparison of weak variant of the Newton-Kantorovich and Miranda theorems," *Journal of Computational and Applied Mathematics*, vol. 166, Issue 2, Apr. 2004, pp. 585-589.

Argyros, "On the Newton-Kantorovich hypothesis for solving equations," *Journal of Computational and Applied Mathematics*, vol. 169, Issue 2, Aug. 2004, pp. 315-332.

Dennis, "On the Kantorovich Hypothesis for Netwon's Method," *SIAM J. Numer. Anal.*, vol. 6, No. 3, Sep. 1969, pp. 493-507.

\* cited by examiner

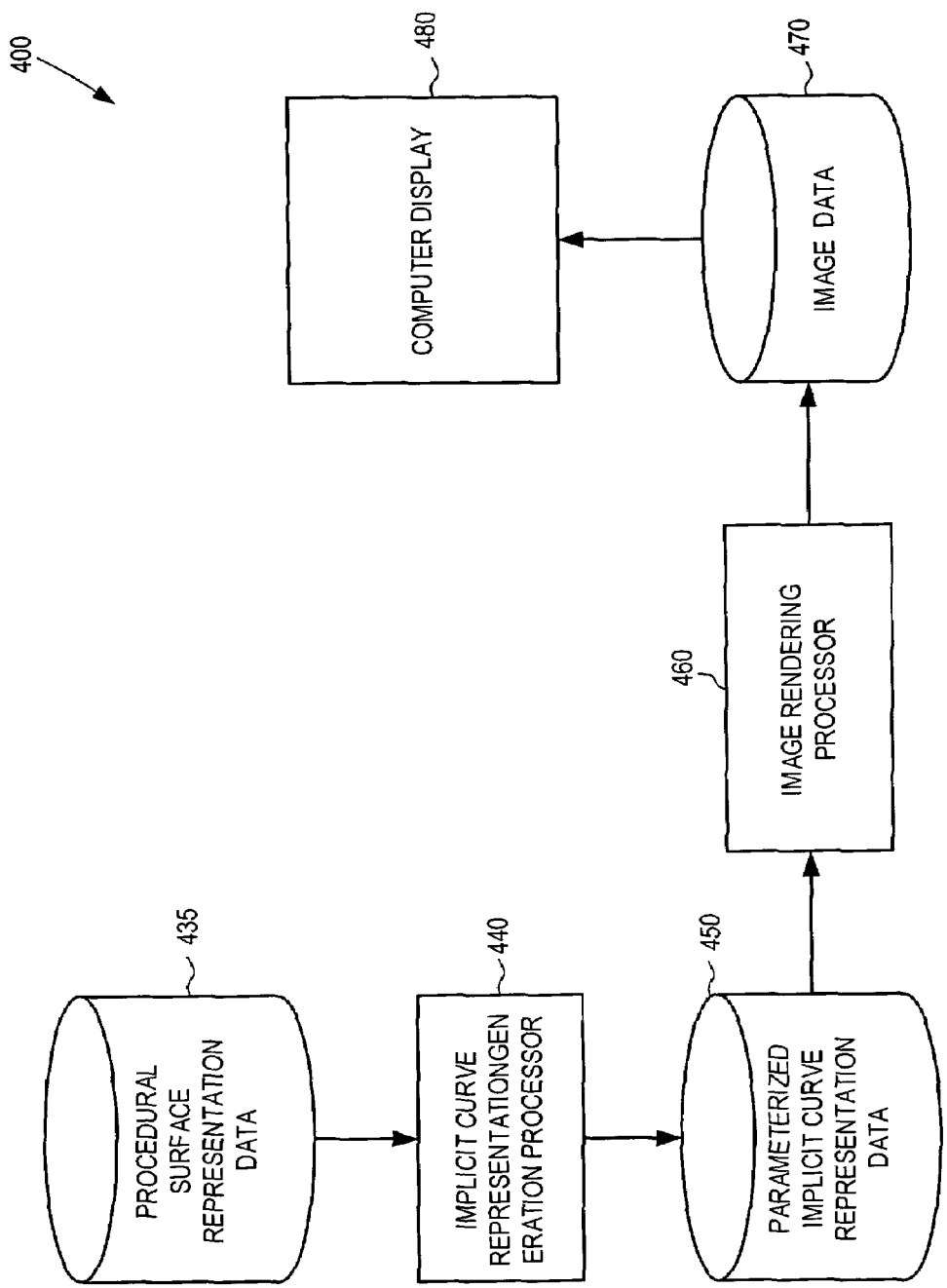

```
bool ConvergenceInRegion (x̄_o)  ～ 1010                                    1000
  input: starting point (x̄_o) = (x̄_p, xd)                                    ↙
  if convergence (x̄_o) return true  ～ 1020
  else
    //subdivide x̄_p
    x̄_p low = (x̄_p, x̄_p.mid)    x̄_p high = (x̄_p.mid, x̄_p)  ～ 1030
    //compute new starting points using Interval Newton
    start low = Interval Newton (x̄_p low.mid)
    start high = Interval Newton (x̄_p high.mid)  ～ 1040 x̄_o low  = (x̄_p low, start low)
    x̄_o high = (x̄_p high, start high)                              1050
                                                                    ↙
    return ConvergenceInRegion (x̄_o low) && ConvergenceInRegion (x̄_o high)
```

FIG. 10

```
bool convergence (x̄₀ = (x̄_p, x_d))
    x̄_i = x̄₀
    while(x̄_i are shrinking){          ~1110
        h̄_i = D⁻¹_D f(x̄_i) f(x̄_i)
        x̄_{i+1} = x̄_i - h̄_i
        U = expand (x̄_{i+1}, h̄_i)
        M = Lipshitz Constant (U)
        if|f(x̄_i)||D⁻¹f(x̄_i)|M < 1/2    ~1120
            return true;
    } //didn't prove convergence so have to subdivide
    //subdivide region but keep same starting point
    x̄ low = ([x̄_p, x̄_p.mid], x_d)
    x̄ high = ([x̄_p.mid, x̄_p], x_d)        1130
    return convergence (x̄ low) && convergence (x̄ high)  ~1140
```

REPRESENTING IMPLICIT CURVES OF PROCEDURAL GEOMETRIC SURFACES

CROSS REFERENCE TO RELATED APPLICATIONS

This application is a continuation-in-part (CIP) of U.S. patent application Ser. No. 10/977,731, filed Oct. 28, 2004, entitled, "Representation of Implicit Curves for Procedural Surfaces," the disclosure of which is incorporated herein by reference.

TECHNICAL FIELD

The technical field relates to modeling of graphical objects in computers graphics. More particularly, the field relates to modeling implicit curves of intersection in procedural geometric surfaces.

BACKGROUND

Procedural surface representations in computer graphics can be orders of magnitude smaller than polygonal or patch-based surface representations, which may be a desirable feature for memory constrained devices like game consoles and cell phones. Compactness is increasingly important because of some current trends in computer hardware. For instance, core processing speed has been increasing much faster than off chip memory bandwidth, so fetching data from memory is steadily becoming more expensive relative to computation. A compact representation can be faster to render than a larger one, even if much more computation is required to process the compact representation. Because of their compactness, procedural models would seem to be a better fit to this trend than polygon meshes or polynomial surfaces.

Constructive Solid Geometry (CSG) is a method of modeling procedural graphical surfaces, whereby more complex surfaces are modeled as a combination of simpler surfaces. For instance, in computer graphics, CSG methods provide a powerful way for defining surfaces of higher genus (e.g., a sphere with a hole) from surfaces of lower genus, such as a plain cylinder and plain sphere. CSG components, including primitives such as cylinders and spheres, can be described in terms of a procedure or a function that accepts some number of parameters. For instance, a spherical three-dimensional (3D) surface can be defined procedurally in terms of coordinates of its center and a value of its radius. More complex objects can then be modeled through CSG operations performed using such procedural objects. Virtually any manufactured object may be modeled using CSG operations in combination with surfaces of revolution and generalized extrusions, both of which are easily programmed procedurally. Also, the addition of CSG operations to procedural surfaces dramatically increases the scope of objects that can be modeled procedurally.

Defining parametric procedural surfaces of genus 0 (e.g., a sphere) and some surfaces of genus 1 (e.g., a torus) is usually straightforward since complexities, such as holes in the surface domain, are typically absent. However, for surfaces of higher genus, it is much more difficult since domains of some parametric surfaces may have holes whose boundaries are, in some sense, only implicitly defined (e.g., as an intersection of surfaces). These boundaries are difficult to program manually.

For instance, CSG operations may require computing and representing curves of intersection between the two or more surfaces being operated upon. These curves, in general, are defined only implicitly as the solution to an equation of the form $f(x_1, \ldots, x_n)=0$. These equations are not easy to evaluate and typically require a sophisticated, slow, and computationally costly global zero finding solver. A more compact, exact, and resolution independent representation of such curves on the other hand may be efficiently evaluated at runtime on a graphics processing unit (GPU). Such representation may be a highly desirable feature for memory constrained devices, like game consoles or for bandwidth constrained applications. Also, such representations make it possible to represent high genus surfaces in an entirely procedural way at a significantly reduced memory cost while not significantly increasing the computational costs required for rendering such surfaces to be displayed.

Nevertheless it is desirable to have the opportunity to have a trade-off between reducing memory and bandwidth consumption and increasing computational costs. This will continue to hold true, at least so long as the trend of increasing computation capability of processors continues.

SUMMARY

Described herein are methods and systems for accurately generating compact parametric representations of implicit functions. In one aspect, the implicit functions relate to implicit curves of intersection generated by the way of constructive solid geometric operations involving a plurality of procedural surfaces of graphical objects.

In yet another aspect, the implicit curve is divided into parameterization regions comprising ranges of values of parameterization variables. In one aspect, an intervalized super convergence test comprising applying a Kantorovich condition may be applied to selected parameterization ranges in order to determine whether the dependent variables associated therewith converge to a solution. Such ranges may be designated as convergence regions and used to generate a compact and accurate representation of the implicit curve.

In a further aspect, the compact representation of the implicit curve can be realized by storing sparse data indicating the convergence regions and sparse data for indicating starting points associated therewith. In one aspect, the sparse data related to starting points comprise data indicating a suitable method for deriving the starting points at runtime. In one aspect, runtime derivation of the starting points might involve retrieving starting point coordinates based on midpoints of the parameterization regions involved. In other aspects, the runtime derivation of the starting points might involve calculating the starting points based on approximations of the implicit curves. The curve approximations may be one of a straight-line approximation between known endpoints or a cubic approximation between the known endpoints of the curve.

In further aspects, the coordinate data of points on the curve, including endpoints of convergence regions or parameterization regions, can be stored in a compact manner. For instance, among a plurality of endpoints related to a plurality of regions describing an implicit curve, storing coordinates of just one endpoint along with ranges of the appropriate parameterizing variables indicating may be sufficient to indicate the parameterization regions of a curve. The coordinates of the other endpoints can be iteratively calculated at runtime by applying Newton iterations starting with the known endpoint.

In one further aspect, stored coordinate information can be further pruned by quantizing the coordinate data by rounding the coordinates to the nearest integer value. Later, at runtime, the actual coordinates having floating point accuracy can be derived by the way of applying Newton iterations starting from the point defined by the quantized coordinates.

Additional features and advantages will become apparent from the following detailed description of illustrated embodiments, which proceeds with reference to accompanying drawings.

BRIEF DESCRIPTION OF THE FIGURES

FIG. 4C is a block diagram describing an exemplary system for generating and processing parameterized representations of implicit curves to render images comprising implicit curves on a computer display.

FIG. 10 is a listing describing an algorithm for determining convergence regions based on applying a super convergence test to iteratively sub-divided portions of one or more parameterization regions.

FIG. 11 is a listing describing an exemplary algorithm comprising a super convergence test iteratively applied to determine convergence regions.

DETAILED DESCRIPTION

Exemplary Overall Methods for Generating Representations of Implicit Functions

Figure 1:
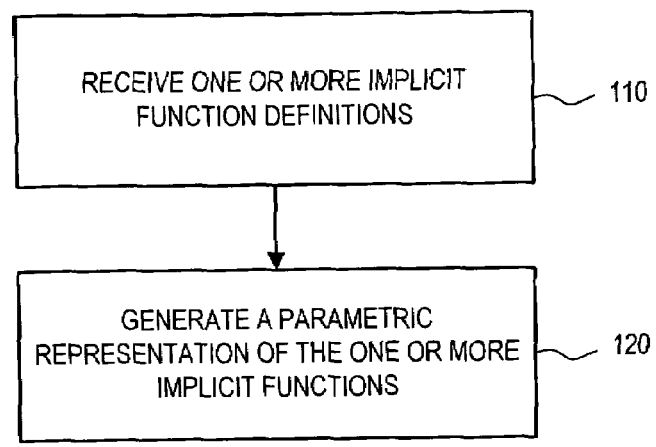
FIG. 1 is a flow diagram describing exemplary overall methods for generating parametric representations of implicit functions.

FIG. 1 illustrates an exemplary method for generating representations of functions that are defined implicitly. According to this exemplary method, at 110, definitions of one or more implicit functions are received and at 120, one or more parametric representations corresponding to the one or more implicit functions are generated. Among other things, such parametric representations allow for expressing implicit functions in an efficient manner. Alternative implementations of implicit function representation generating methods can include fewer or more operations.

Exemplary Implicit Curves of Intersection

Figure 2:
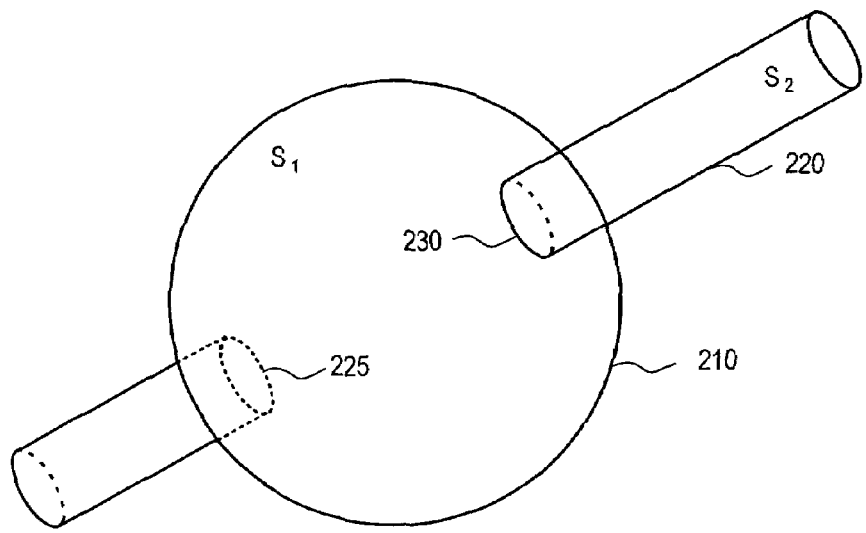
FIG. 2 is a block diagram illustrating exemplary implicit curves of intersection generated by the intersection of two exemplary procedural objects.

FIG. 2 illustrates an exemplary implicit function representation. As shown in FIG. 2, an exemplary sphere surface $S_1$ at 210 intersects an exemplary cylinder surface $S_2$ at 220 to form curves of intersection at 225 and 230. The function defining the curves 225 and 230 can be defined implicitly as an intersection of the sphere surface $S_1$ 210 and the cylinder surface $S_2$ at 220. For instance, if the sphere surface $S_1$ 210 is a function $f_1$ ($u_0$, $u_1$) and the cylinder 220 is represented by some function $f_2$ ($u_2$, $u_3$), then the intersection of the two surfaces 225 and 230 are implicitly represented as some function $F=f_1$ ($u_0$, $v_0$)$-f_2$ ($u_1$, $v_1$)$=0$. Thus, the primitives $S_1$ at 210 and $S_2$ at 220 are defined procedurally in terms of domain variables ($u_0$, $v_0$) and ($u_1$, $v_1$), respectively. As a result, the function $F(u_0, v_0, u_1, v_1)$ can also be defined procedurally. Once such curves are defined procedurally they can be manipulated much more easily by a Graphics Processing Unit (GPU) for accomplishing animation, for instance. Identifying the intersection and representing the intersection are typically computationally expensive, however, and may also consume large amounts of memory for storage. However, it is possible to generate parametric representations of such implicit curves that are exact, compact, resolution independent and easily evaluated at runtime in a procedural way.

Exemplary Parametric Representations

Given the procedural function $F(u_0, v_0, u_1, v_1)$ as described above where $F(\bar{x})$ is such that $(\bar{x})$ is a range of values of the 4-dimensional (4D) domain variables ($u_0$, $v_0$, $u_1$, $v_1$) and suppose there is a function FP $(\bar{x}_p)=\bar{x}_d$ such that $\bar{x}_p$ and $\bar{x}_d$ partition the domain $\bar{x}$ into parameterizing variables (also known as independent variables) and dependent variables, respectively. If the F($\bar{x}$) is such that F: $R^m \to R^n$, then m−n may denote the number of parameterizing variables in a transformation. Thus, the function FP $(\bar{x}_p)$ allows for the dependent variables $\bar{x}_d$ to be expressed in terms of the independent or parameterizing variables $\bar{x}_p$. The actual number of m variables compared to n variables in a function F: $R^m \to R^n$ can vary. For instance, a 4→3 transformation is one typical transformation in CSG. The ability to parameterize an implicit function has the immediate advantage of reducing the memory needed to store a representation of such a function, since values of dependent variables can be derived from values of the independent or parameterizing variables.

Exemplary Methods for Determining Parameterization

It may not be always possible to parameterize an implicit function. More particularly, not every variable of an implicit function can be used in an expression as a parameterizing variable to express other variables of the function. One way to prove the possibility of a parameterization by any of the domain variables of an implicit function is to apply a simple form of the implicit function theorem to determine which of the various dependent derivative matrices of such a function approach non-singularity. For instance, in the example above, wherein F is such that F: $R^4 \to R^3$ with 4 domain variables and 3 range variables and $F(u_0, v_0, u_1, v_1) = F(f_x, f_y, f_z)$ will yield a derivative matrix as follows:

$$\begin{array}{cccc} \frac{\partial f_x}{\partial u_0} & \frac{\partial f_x}{\partial v_0} & \frac{\partial f_x}{\partial u_1} & \frac{\partial f_x}{\partial v_1} \\ \frac{\partial f_y}{\partial u_0} & \frac{\partial f_y}{\partial v_0} & \frac{\partial f_y}{\partial u_1} & \frac{\partial f_y}{\partial v_1} \\ \frac{\partial f_z}{\partial u_0} & \frac{\partial f_z}{\partial v_0} & \frac{\partial f_z}{\partial u_1} & \frac{\partial f_z}{\partial v_1} \end{array}$$

Suppose a dependent derivative matrix with $u_0$ as the independent variable is as follows:

$$\begin{array}{ccc} \frac{\partial f_x}{\partial v_0} & \frac{\partial f_x}{\partial u_1} & \frac{\partial f_x}{\partial v_1} \\ \frac{\partial f_y}{\partial v_0} & \frac{\partial f_y}{\partial u_1} & \frac{\partial f_y}{\partial v_1} \\ \frac{\partial f_z}{\partial v_0} & \frac{\partial f_z}{\partial u_1} & \frac{\partial f_z}{\partial v_1} \end{array}$$

Figure 3:
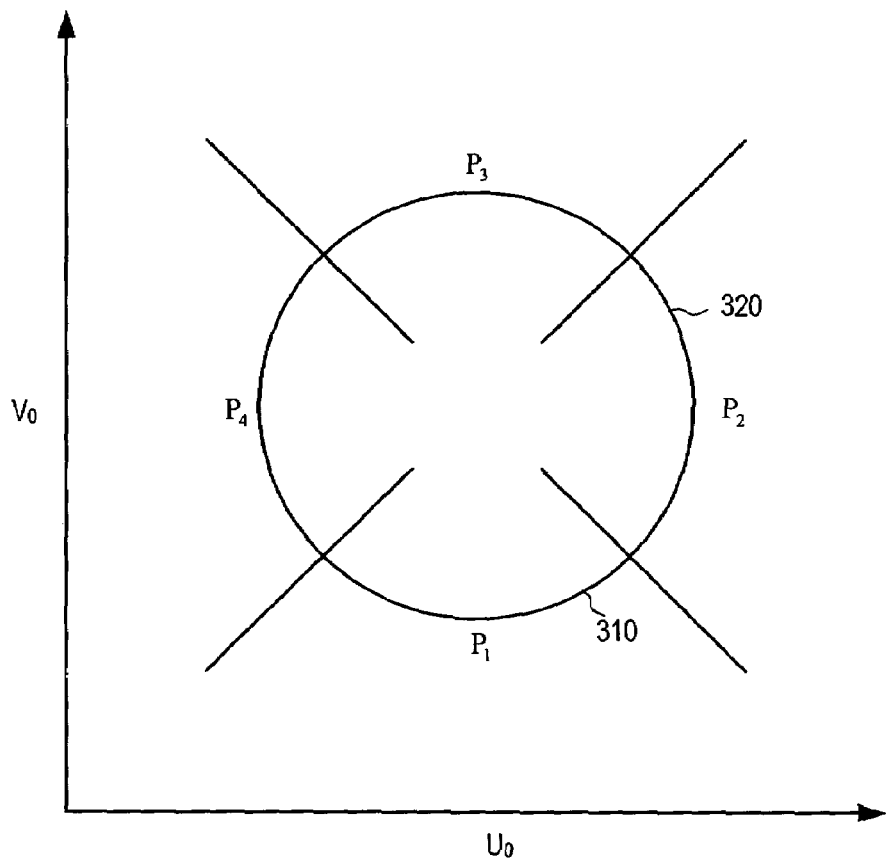
FIG. 3 is a block diagram illustrating exemplary partitioning of a domain for determining parameterizing variables.

According to a simple form of the implicit function theorem, if the above dependent derivative matrix is non-singular such that no one column of the matrix can be expressed as a weighted sum of the others, then the implicit function can be expressed in a parametric form with $u_0$ in this instance as the parameterizing variable. Dependent derivative matrices based on the other variables also may be non-singular, and thus, indicate the possibility of parameterization of the function based on these other variables such that these other variables also may serve as parameterizing variables. However, there may be advantages in selecting one variable as the parameterzing variable over others to parameterize different parts of a curve. As shown in FIG. 3, for instance, within a 2D domain, such as $(u_0, v_0)$, parameterization regions, can be selected based on non-singularity property of the relevant dependent derivative matrices. For instance, in FIG. 3, at 310 ($P_1$), $u_0$ is chosen as the parameterizing variable, whereas at 320 ($P_2$) $v_0$ is chosen. This is at least partially dependent on the fact that within the region 310 ($P_1$) every value of the parameterizing or independent variable $u_0$ is guaranteed to have just one corresponding value of the dependent variable $v_0$. The same principle can confirm the choice of $v_0$ as the parameterizing variable within the $P_2$ region. The same holds true for regions $P_3$ and $P_4$ having parameterizing variable choices of $u_0$ and $v_0$, respectively. However, if the whole curve in FIG. 3 was chosen as a single parameterizing region, no one variable $u_0$ or $v_0$ is guaranteed to have each of their values on the curve correspond to a single value of the other variable that is dependent. As a result, the curve of FIG. 3 can be divided into exemplary parameterizing regions $P_1$, $P_2$, $P_3$, and $P_4$. The 2D parameterization regions shown in FIG. 3 are merely illustrative. The same principle holds true for domains with higher dimensionalities, as well.

Exemplary Overall Methods for Representing Implicit Curves

Figure 4A:
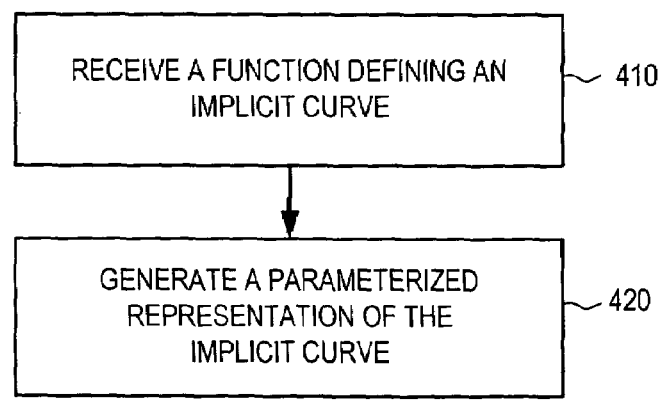
FIG. 4A is a flow diagram describing exemplary overall methods for generating parametric representations of implicit curves.

Thus, based on determining the possibility of parameterization of implicit curve functions and selecting parameterization regions and their corresponding parameterizing variables, as described above, a parameterized representation of an implicit curve can be calculated. FIG. 4A illustrates one such exemplary overall method for calculating parameterized representations of an implicit curve. As shown in FIG. 4A, at 410, a function defining an implicit curve is received, and at 420, a parameterized representation of the implicit curve is generated based on parameterizing the implicit curve function. Alternative implementations of this exemplary method may optionally omit the operations 410 and 420 or include additional operations.

Figure 4B:
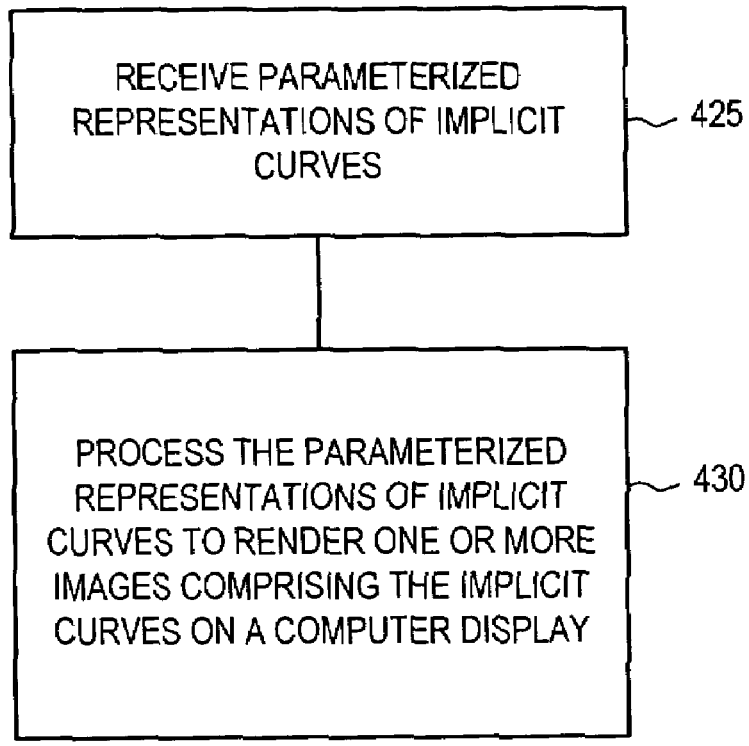
FIG. 4B is a flow diagram describing exemplary overall methods for processing parametric representations of implicit curves to render images comprising implicit curves on a computer display.

Exemplary Methods for Processing Parameterized Implicit Curve Representations FIG. 4B illustrates exemplary methods for processing parameterized implicit curve representations by a GPU, for instance. According to this method, at 425, the GPU receives a parameterized representation of an implicit curve, generated, for instance, as shown in FIG. 4A. At 430, the GPU processes the parameterized representations of the implicit curve to render an image comprising the implicit curves described by the parameterized representation thereof. Alternative implementations of this exemplary method may optionally omit the operations 425 and 430 or include additional operations.

Among other things, a compact representation of implicit curves reduces the memory bandwidth needed to transfer data related to the procedural CSG surfaces comprising the implicit curves based on which, the GPU renders images of the surface comprising the implicit curves. Thus, compact representations of implicit curves allow the GPU to process more image data at runtime to render a more rich set of images on a computer display.

An Exemplary System for Generating and Processing Parameterized Implicit Curve Representations FIG. 4C illustrates an exemplary system 400 for generating and processing a compact parameterized representation of an implicit curve. The system comprises an implicit curve representation generation processor 440, which receives data related to procedural surface representations of one or more graphical objects 435 and generates data 450 related to one or more parameterized representations of implicit curves formed based on the procedural representations of one or more graphical objects 435. For instance, the implicit curve representation generation processor 440 can use the methods of FIG. 4A to generate the data 450 related to one or more parameterized representations of implicit curves.

The image rendering processor 460 (e.g., a GPU) receives the data 450 related to one or more parameterized representations of implicit curves and processes the data 450 to generate image data 470 for displaying images comprising the implicit curves on the computer display 480. For instance, the image rendering processor 460 may be a GPU programmed for transforming the parameterized representations of the implicit curves through tessellation methods for generating polygon-based representations of implicit curves for displaying the implicit curves along with other image components on a computer screen 480.

Figure 5A:
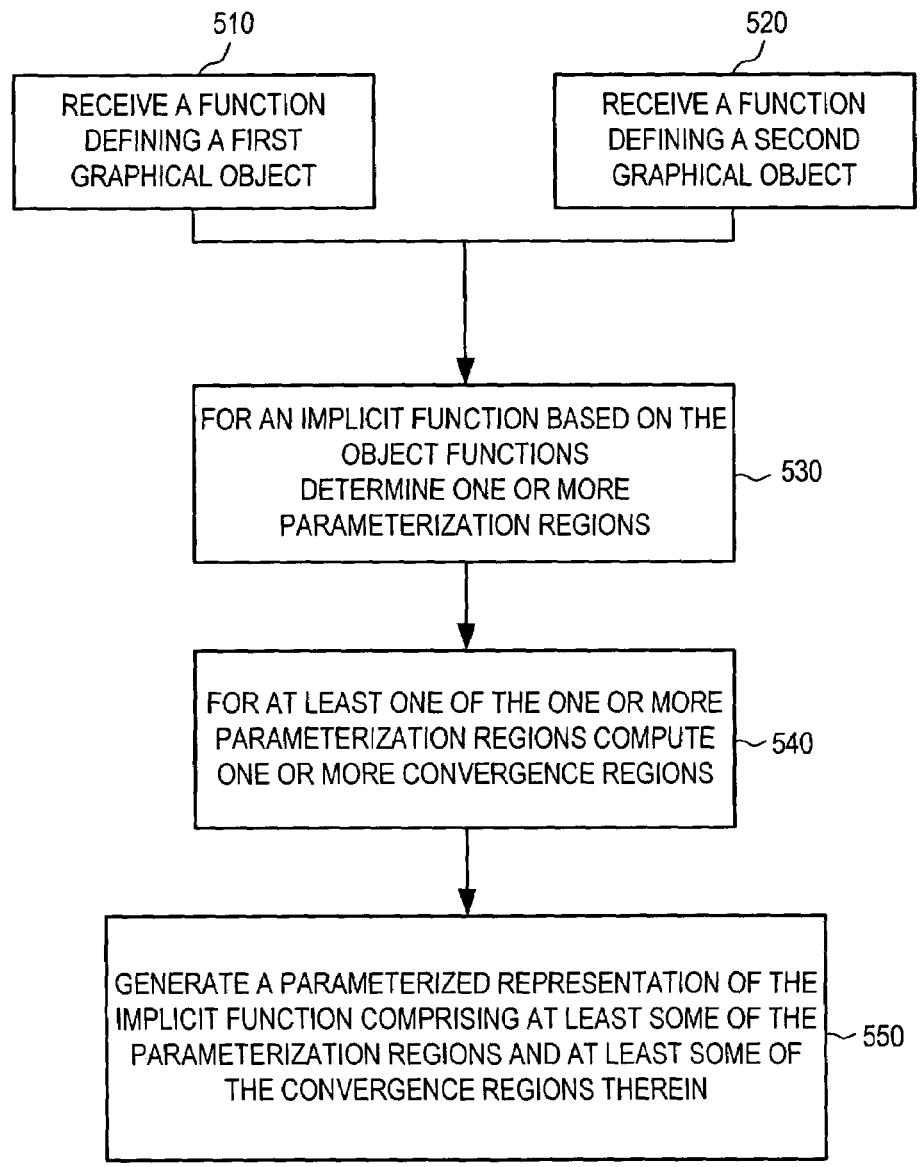
FIG. 5A is a flow diagram describing exemplary overall methods for generating parametric representations of implicit curve functions comprising convergence regions.

Exemplary Methods for Generating Parameterized Representations of Implicit Curves Comprising Determining Convergence Regions FIG. 5A illustrates a more detailed description of methods of calculating a parameterized representation of an implicit curve (e.g., 225 and 230 of FIG. 2). For instance, the implicit curve representation generation processor 440 in FIG. 4C can be programmed to implement the methods described below. According to this method, at 510, a function defining a first object (e.g., $S_1$ at 210) is received and at 520, a function defining a second object (e.g., $S_2$ at 220) is received. Then at 530, for an implicit curve function defined at least partially based on some operation on the functions of the first and the second objects (e.g., $f_1(u_0, u_1) - f_2(u_2, u_3) = 0$ defining a curve of intersection of procedural surfaces $S_1$ and $S_2$) parameterizing regions are first determined (e.g., as shown above with reference to FIG. 3).

The implicit function theorem relying on the non-singularity property of the appropriate dependent derivative matrices confirms that parameterization of dependent variables using the parameterizing variables is possible. Thus, solving for a range of values of the parameterizing variables over which parameterization of the dependent variables is possible based on the non-singularity of the relevant dependent derivative matrices yields parameterization regions. However, further calculations are needed to solve for dependent variable values that yield $f_1(u_0, u_1) - f_2(u_2, u_3) = 0$ for determining the implicit curve described above over a range of the parameterizing variable. Such a range of the parameterizing variable may be referred to as a convergence region.

For instance, if we have a parameterization region $u_i$ such that there is some function $g(u_i) = u_d$ wherein $u_d$ is a 3 vector of functions that define the dependent variables in terms of scalar parameterizing variable $u_i$. In that case, $g(u_i)$ would be a parametric form of some implicit curve function, such as $F_{csg}(u_0, v_0, u_1, v_1) = f_1(u_0, v_0) - f_2(u_1, v_1) = 0$. Suppose one can use the notation $u = [u_{ic}, u_d]$ to indicate a 4 vector point consisting of the scalar $u_{ic}$, then $F_{csg}(u_{ic}, u_{dc}) = 0$ can represent the implicit curve of intersection.

In that case, given the parameterizing region $\overline{u_{ic}}$, in order to solve for a point on the curve corresponding to the parameter value $u_{ic}$, such that $F_{csg}(u_{ic}, u_{dc}) = 0$, we need to find the unique 3 vector $u_{dc}$ that satisfies $F_{csg}(u_{ic}, u_{dc}) = 0$. To do this, one could use Interval Newton to solve this equation, but it is orders of magnitude too slow for real time use. Conventional Newton iteration is faster and simpler, but in order to use it, two questions need answers: 1) what starting point, $[u_{ic}, u_s]$, should we use for a given $u_{ic}$ and 2) for what range of values of the parameterzing variable $\overline{u_{ic}}$ can the Newton iteration be guaranteed to converge, starting from $[u_{ic} \in \overline{u_{ic}}, u_s]$ to the correct point on the curve?

Based on these answers, the parametric function $g(u_i)$ for one parametric region $\overline{u_i}$ can be constructed by partitioning $\overline{u_i}$ into intervals of guaranteed convergence $\overline{cr_k}$, each of which has an associated starting point $u_s$. To compute a point $(u_{ic}, u_d)$ on the curve first, find such that $\overline{cr_k} | u_{ic} \in \overline{cr_k}$ so that scalar value $u_{ic}$ is within the convergence region. Then, use the 4 vector $[u_{ic}, u_s]$ as the starting point for the Newton iteration as follows:

$$U_{dj+1} = U_{dj} - D^{-1}(f(u_{ic}, u_{dj}))f(u_{ic}, u_{dj})$$

On the average, three to four iterations may be enough. This Newton iteration is evaluated at runtime to compute points on the implicit curve based on definitions of convergence regions and associated starting points.

Figure 5B:
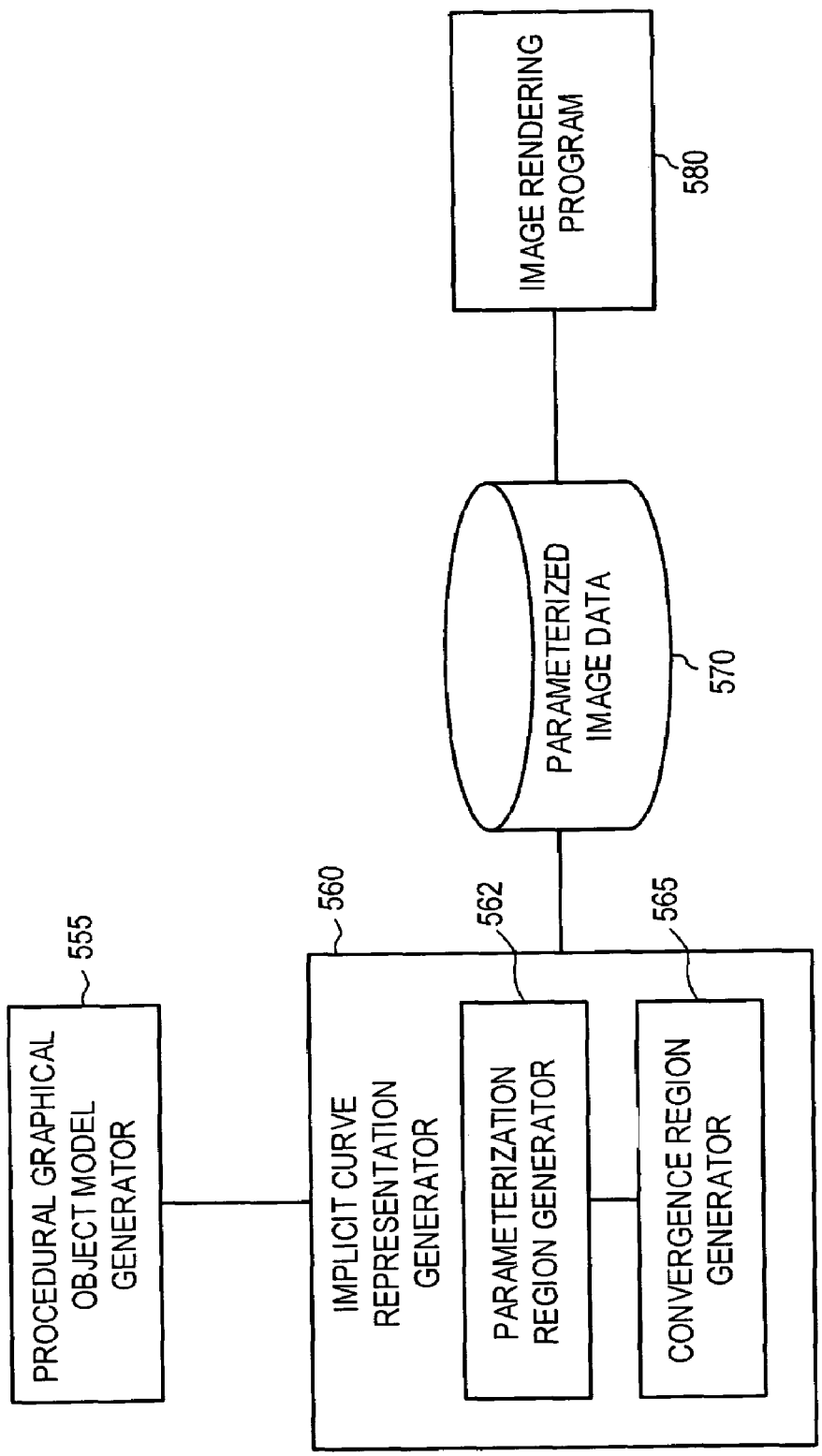
FIG. 5B is a block diagram describing a system for generating parametric representations of implicit curve functions comprising convergence regions.

In one example, the entire parameterization region may also be the convergence region. Alternatively, several convergence regions and several starting points corresponding to these convergence regions may comprise a parameterization region. For an efficient and compact representation of an implicit curve, the lesser the data defining the convergence regions and their associated starting points, the better it is. As shown, at 540 in FIG. 5, one or more convergence regions are determined for at least one of the parameterization regions. Upon which, at 550, a parameterized representation of the implicit curve function is expressed in form of data representative of the parameterization regions, convergence regions therein, and associated starting points.

As noted above, an implicit curve representation generation processor 440 in FIG. 4C can be programmed to implement the methods described with reference to FIG. 5A for generating parameterized representation of implicit curves. For instance, the implicit curve representation generation processor 440 is programmed to execute the instructions of an exemplary implicit curve representation generator module 560 in FIG. 5B for processing procedural graphical objects from a modeling program 555. Such an implicit curve representation generator module 560 comprises a parameterization region generator 562 for generating parameterizing regions and a convergence region generator 565 for determining convergence regions from the parameterizing regions for representing implicit curves. The parameterized representations of implicit curves are stored as parameterized image data 570, which can be processed by an image rendering program 580 to display the images on a computer display.

Exemplary Methods for Determining Convergence Regions

Figure 6:
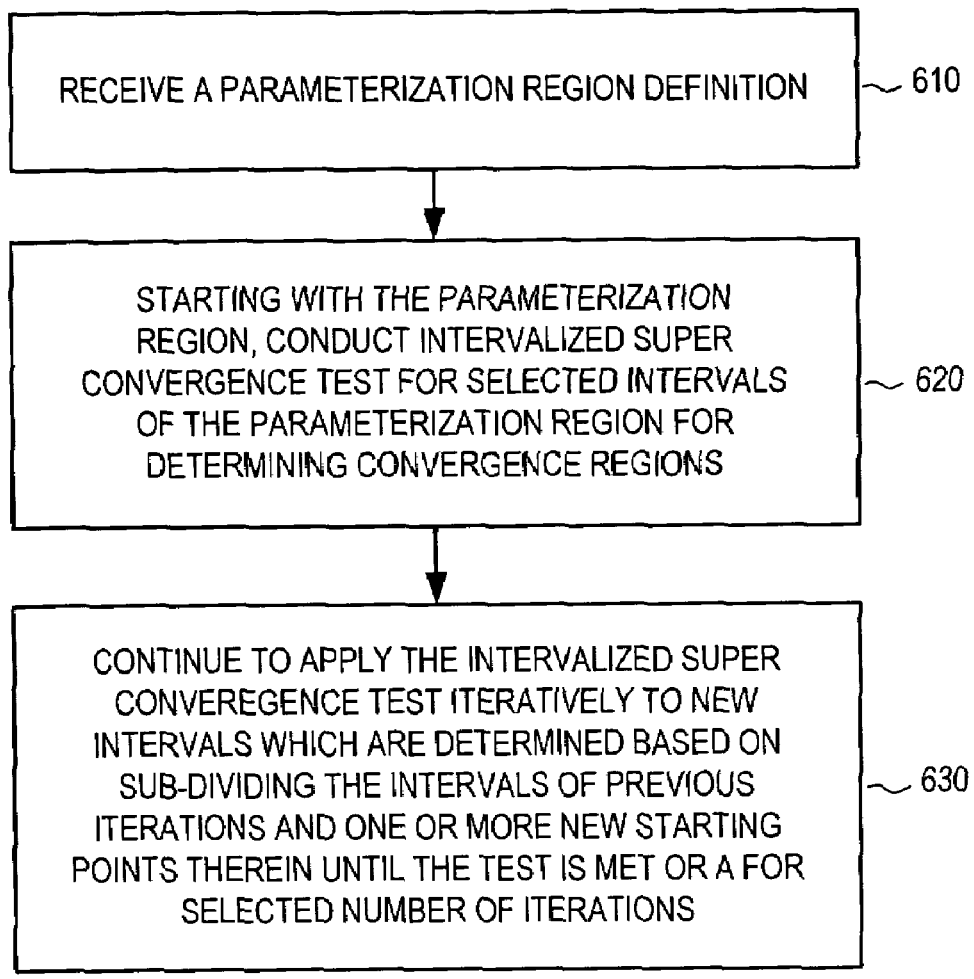
FIG. 6 is a flow diagram describing exemplary overall methods for determining convergence regions of selected parameterizing variables of an implicit function.

As noted above with respect to FIG. 5A, once parameterization regions are determined, ranges of values of parameterizing variables within the parameterization region are determined, which yield values of the dependent variables that converge to a single solution (e.g., 540 and 550). FIG. 6 illustrates one overall method for determining such convergence regions. At 610, a definition of a parameterization region is received. Then at 620, starting with the entire parameterization region and with one starting point chosen (e.g., middle of the range of values of the parameterization region) from within the parameterization region, an intervalized super convergence test is conducted to determine whether the entire parameterization region converges.

An intervalized super convergence test comprises an interval extension to the simple single value form of the implicit function theorem. In general, an intervalized super convergence test is applied over an interval of values of a parametrizing variable, as opposed to a single value of the same.

Suppose, for instance, that the implicit function $F(u_0, v_0, u_1, v_1) = F(\overline{x}) = 0$ defines an implicit curve of intersection and there is a function FP $(\overline{x}_p) = \overline{x}_d$ such that $\overline{x}_p$ and $\overline{x}_d$ partition the domain $\overline{x}$ into parameterizing variables (also known as independent variables) and dependent variables, respectively. Then taking a starting point on the curve $\overline{x}_o = (\overline{x}_p, x_d)$ such that $x_d$ is a starting point value of dependent variables and $\overline{x}_p$ is a range of parameterizing variables if Kantorovich's theorem holds true for the starting point $x_d$, then the Newton iteration from the starting point will converge to a solution of the implicit function for the values of the parameterizing variable within the range $\overline{x}_p$. For instance, Kantorovich's theorem in this example may be stated as follows:

If $|f(\overline{x}_o)||D^{-1}f(\overline{x}_o)|^2 m < \frac{1}{2}$; where m is provided by the Lipschitz given by $|Df(u_0) - Df(v_0)| \leq m^* |u_0 - v_0|$ for all $u_o$, and $u_1$ in U, then a Newton Iteration stated as $x_{i+1} = x_i + |Df(x_i)|f(x_i)$ super converges to a unique solution.

Also, the condition If $|f(\overline{x}_o)||D^{-1}f(\overline{x}_o)|^2 m < \frac{1}{2}$ herein is referred to as Kantorovich condition. If Kantorovich condition equals to $\frac{1}{2}$, that suggests a simple convergence. On the other hand, super convergence is reached if the same expression yields value $<\frac{1}{2}$. Thus, as shown above, an intervalized super convergence test applies the Kantorovich condition to a range of values.

Nevertheless, a conventional application of Kantorovich's theorem to a range of values yields convergence regions that are very small. This may be so because, in general, Kantorovich's theorem is very pessimistic. Also, the Kantorovich condition is not a necessary condition, it is however a sufficient condition. Thus, if in a first iteration of the application of the super convergence test the Kantorovich condition does not hold true, then as shown at 630 in FIG. 6, the super convergence test, including the Kantorovich condition, can be applied iteratively based on new intervals of the parameterizing variables and new starting points or even the same starting point for that matter.

In one embodiment, new intervals are generated by subdividing the parameterizing variable intervals of previous iterations until some maximum number of iterations or until one sub-division of the intervals converges. Also, in one embodiment such sub-dividing may be by half.

Also, in one embodiment, new starting points on the curve associated with the new intervals can be selected by identifying a middle point of the new interval of the parameterizing variable and the corresponding values of the dependent variables. The sub-dividing and identification of new starting points is continued until one combination of a range of parameterizing variables and an associated starting point therein is determined that meets the super convergence test.

Figure 7A:
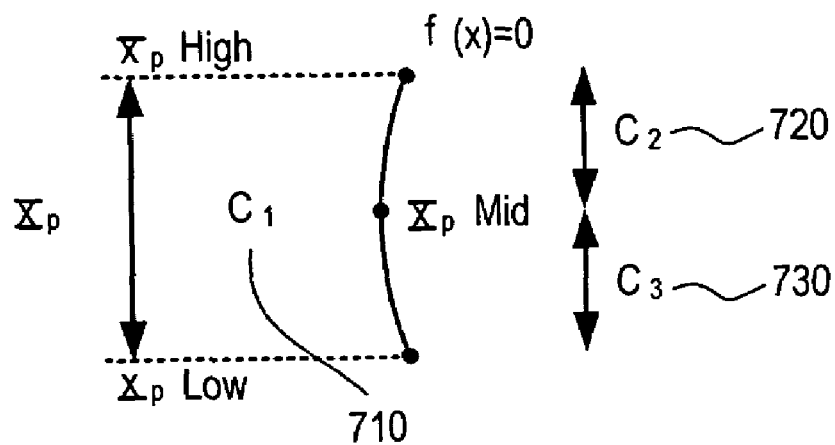
FIG. 7A is a block diagram for illustrating exemplary sub-divisions of exemplary parameterization regions for determining convergence regions therein.
Figure 7B:
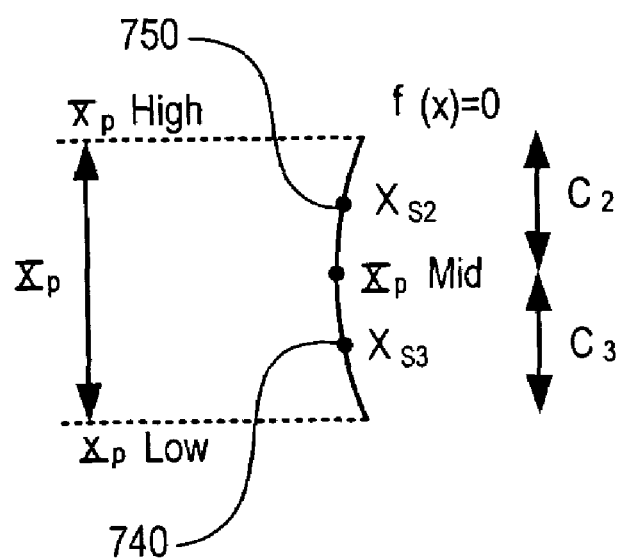
FIG. 7B is a block diagram for illustrating exemplary sub-divisions of exemplary parameterization regions with different starting points identified for each new sub-division for determining the convergence regions.

FIG. 7A illustrates one exemplary sub-division of the parameterization region that can lead to a convergence region. For instance, the entire parameterization region $C_1$, at 710, is tested for super convergence, and if the test is not satisfied, the region $C_1$ is sub-divided further to regions $C_2$ 720 and $C_3$ 730 and each such region is further tested again for super convergence. Furthermore, as shown in FIG. 7B, newer starting points at $x_{s2}$ 750 and $x_{s3}$ 740 are calculated to conduct further testing for super convergence. These processes can be repeated until determining one combination of intervals that meet the super convergence test or until some maximum number of iterations.

An Accelerated Super Convergence Test for Determining Convergence Regions

Figure 8:
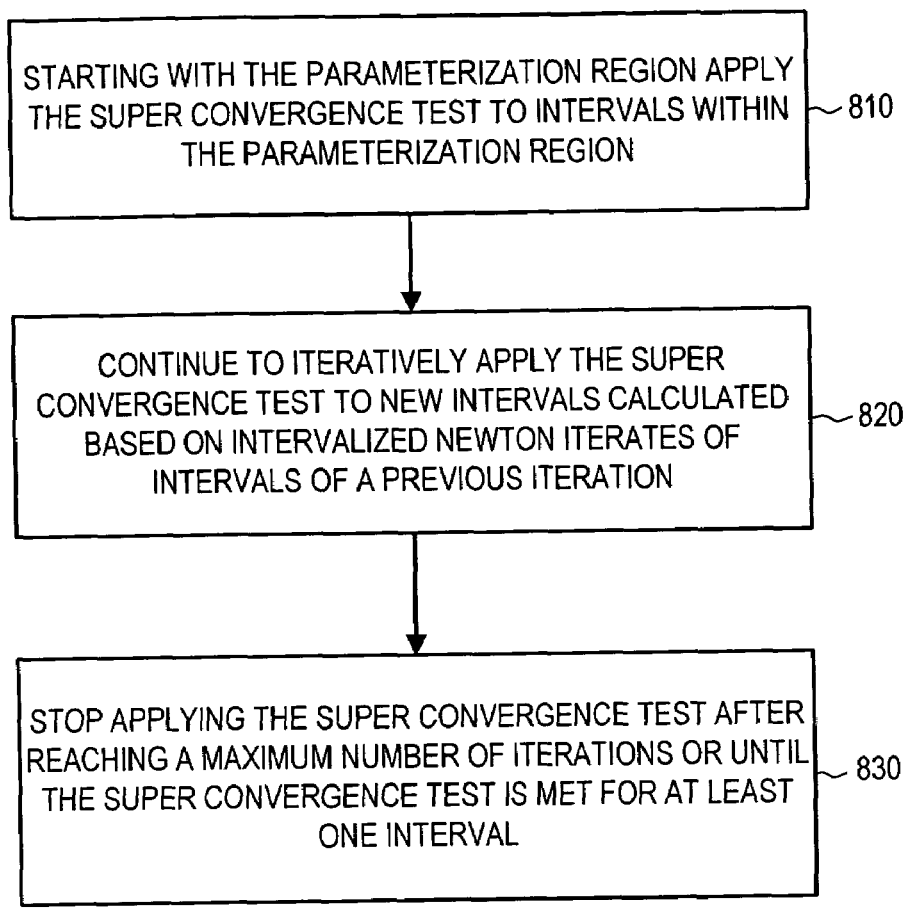
FIG. 8 is a flow diagram illustrating an exemplary method for determining convergence regions using iteratively applied Newton steps to selected ranges.

FIG. 8 illustrates an exemplary method for determining convergence regions comprising a technique for accelerating the process of determining convergence regions with selected sub-divisions of the parameterization regions. At 810, super convergence test is applied to intervals within the parameterization regions. At 820, the super convergence test is re-applied to new intervals calculated, at least partially, based on intervalized Newton iterates of a previous iteration. The choice of Newton iterates further ensures that the range being evaluated is more likely to converge than a guess based on just simple sub-divisions of the parameterization regions and selecting middle points of sub-divisions as the starting points. Then, at 830, the process is continued for a maximum number of iterations or until super convergence test is met for some region being tested.

Figure 9:
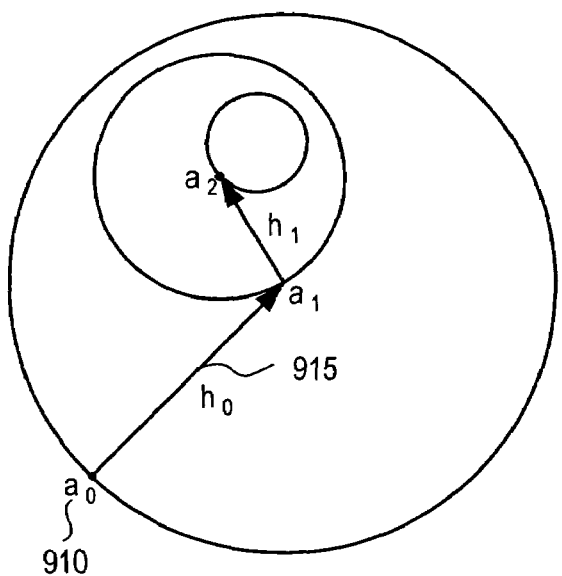
FIG. 9 is a block diagram illustrating the use of Newton steps for determining the convergence regions.

FIG. 9 illustrates the progressive Newton iterate steps, such as $h_0$ at 915, to determine new intervals with new starting points by starting at some point $a_0$ 910 and progressing until identifying regions meeting the super convergence test. Newton iterate steps (e.g., $h_0$) are provided by Newton iteration expression stated as follows:

$$\overline{x_{i+1}} = \overline{x_i} - \overline{h_i}$$

$$h_i = [D_{ui}(f(c, \overline{x_i}))]^{-1} f(c, \overline{x_i})$$

The regions that satisfy the convergence test are then used to represent a parameterized form of an implicit curve.

Exemplary Algorithms for Determining Convergence Regions

FIGS. 10 and 11 illustrate an exemplary algorithm for determining convergence regions by iteratively sub-dividing ranges of values of parameterization region and applying the super convergence test, as described with reference to FIGS. 6, 7, and 8. The implicit curve representation generation processor 440 of FIG. 4C of the system 400 for processing graphical data can be programmed to implement the methods described with reference to FIGS. 10 and 11 below. FIGS. 10 and 11 together illustrate two methods that are recursively called for a selected number of iterations or until a convergence region that satisfies the super convergence test is identified.

In one embodiment, as shown in FIG. 10, at 1010 the ConvergenceInRegion($\overline{x}_o$) method is called for a selected range of values $\overline{x}_o$ on the implicit curve for which convergence is being determined. For instance, the range of values $\overline{x}_o$ may be expressed as $(\overline{x}_p, x_d)$, which comprises a range of values of the parameterizing variables and a corresponding starting set of values for the dependent variables (e.g., those associated with a midpoint of $\overline{x}_o$). Then at 1020, the recursive test for super convergence, which is referred to in this example as convergence($\overline{x}_o$) method (1100 in FIG. 11) is called. If at 1020, the convergence($\overline{x}_o$) (1100 at FIG. 11) method returns 'true', then the range of values $\overline{x}_p$ identified as the range of parameterizing values associated with $\overline{x}_o$ is determined to be the convergence region with $x_d$ as the starting point. A typical initial value for $\overline{x}_o$32 $(\overline{x}_p, x_d)$ may be one where $\overline{x}_p$ is the entire parametrization region and $x_d$ is associated with the midpoint of such a region. However, other ranges of values of $\overline{x}_p$ and their corresponding starting values of dependent variables $x_d$ may also be used. If at 1020, convergence($\bar{x}_o$) (1100) method returns false, then ranges of parameterizing variables $\bar{x}_p$ are iteratively sub-divided at 1030 and new starting points calculated for each region (e.g., $\bar{x}_{pLow}$ and $\bar{x}_{pHigh}$), at 1040, upon which, ConvergenceInRegion($\bar{x}_o$) method is recursively called at 1050 for a selected number of times or until the convergence regions are determined.

FIG. 11 illustrates an exemplary super convergence test for determining convergence regions. In one embodiment, the super convergence test comprises applying the Kantorovich condition iteratively to selected ranges of values on an implicit curve, wherein the range may be changed iteratively by a Newton iterate step. Thus, as shown in the exemplary super convergence test convergence($\bar{x}_o$), at 1110, while ($\bar{x}_i$ are shrinking) is true, Newton iterate steps $\bar{h}_i$ may be used to change the potential convergence region being tested and each new range is evaluated for compliance with the Kantorovich condition at 1120, and if true, the range of parameterizing variable values associated with the range $\bar{x}_i$ changed by the Newton step (e.g., $\bar{h}_i$) is identified as the convergence region. If the Kantorovich condition 1120 does not hold true, then the range of values of the parameterizing variables $\bar{x}_p$ is sub-divided further at 1130 and the convergence( ) method 1100 is called on the sub-divisions recursively at 1140 for each of the sub-divisions with the same starting point $x_d$. This iteration can be continued up to a point where the convergence region is too small and returned back to the process of FIG. 10 to start with a new starting point.

The "while ($\bar{x}_i$ are shrinking)" condition at 1110 allows for Newton steps to be taken until some point when the steps become so small that any rounding errors related to the floating point calculation would actually start to grow the $\bar{x}_i$ range instead of shrinking it. The "while ($\bar{x}_i$ are shrinking)", however, is an exemplary condition. Other conditions may be used to determine how many Newton steps are to be taken and in which direction.

In one alternative, the sub-divisions of ranges within parameterization regions which are called within methods the ConvergenceInRegion( ) 1000 and convergence( ) 1100 may be ½ divisions of such ranges determined during previous iterations. However, such sub-divisions need not be restricted to dividing the previous ranges by half. Other divisions (e.g., ¼) may be used.

Exemplary Convergence Data

Once convergence regions are determined, data descriptive of such regions are stored for later use. There are costs associated with storing and transferring such data descriptive of the convergence regions including such as data indicative of the range of values of the parmeterizing variable (e.g., $C_2$ and $C_3$ of FIG. 7B) and data indicative of the associated starting points (e.g., $X_{s2}$ and $X_{s3}$ in FIG. 7B). It is based on this data that the actual points on the related implicit curve will be derived at runtime. However, reducing the costs of transferring such data to the processor evaluating points on a curve (e.g., 460 in FIG. 4C) can be advantageous for memory bandwidth constrained applications (e.g., cellular phones).

In addition to memory, related costs, computational costs are also of concern. For instance, if the starting point guessed at the beginning of a convergence analysis, such as the midpoint of parameterization region being analyzed, happens to be far away from the point being evaluated, then it may take numerous Newton iteration steps to derive the point on the curve, even if convergence has been proven in an offline calculation.

Figure 12:
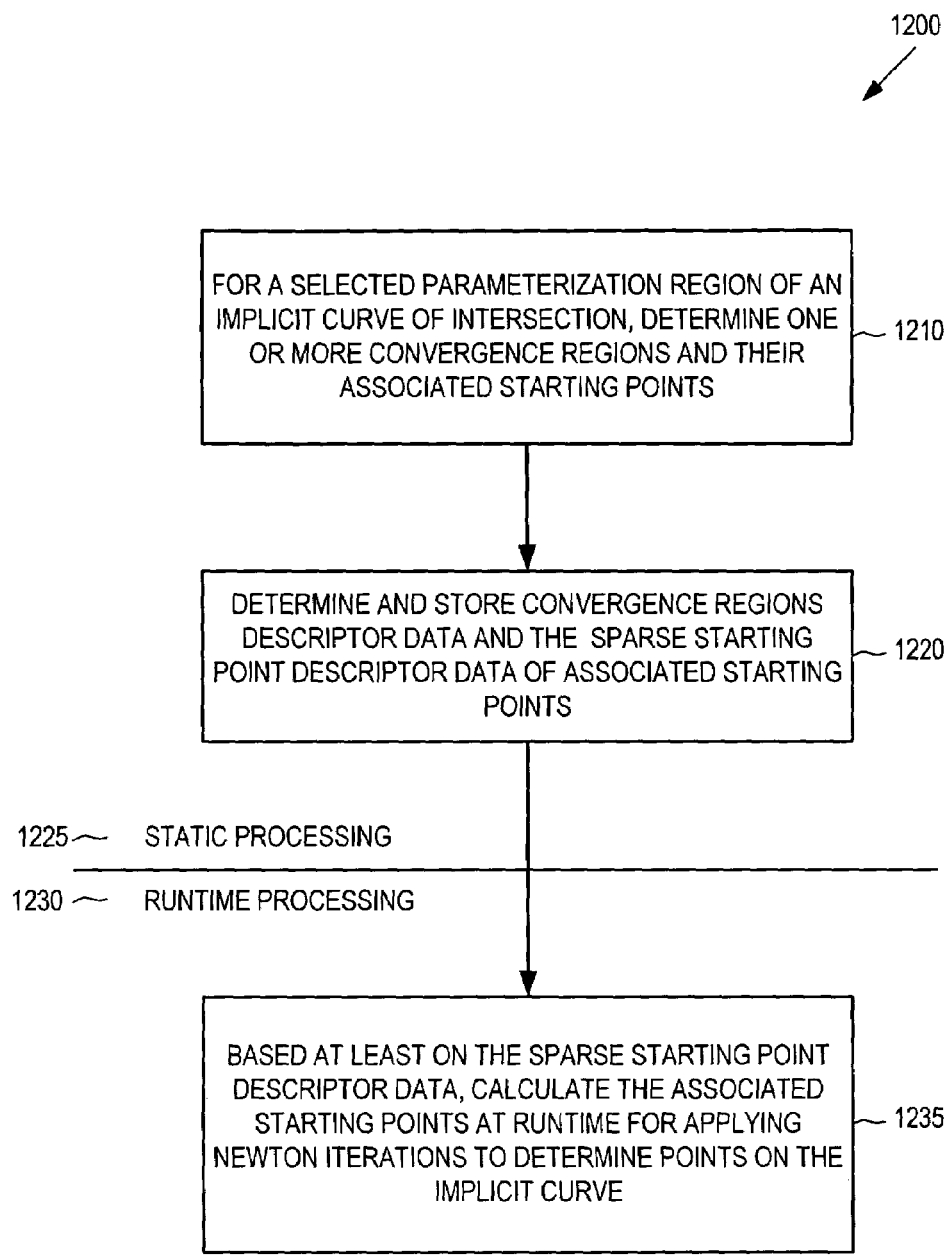
FIG. 12 is a flow diagram describing an exemplary method for determining sparse parameterized forms of an implicit curve.

FIG. 12 describes one method 1200 for determining convergence data that can be more accurate and sparse at the same time. At 1210, one or more convergence regions and their associated starting points are determined for a selected parameterization region. At 1220, descriptor data for regions of convergence and descriptor data of their associated starting points are stored. The starting point data need not be in terms of domain coordinates (e.g., $u_{0s}$, $v_{0s}$, $u_{1s}$, $v_{1s}$), which can be costly in terms of memory. Instead, it can be stored in a sparse form during static processing 1225, such that, later during runtime processing 1230 at step 1235, the actual starting point can be calculated, based at least in part on the sparse descriptor, for applying Newton iteration to determine the points on the associated curve.

Figure 13:
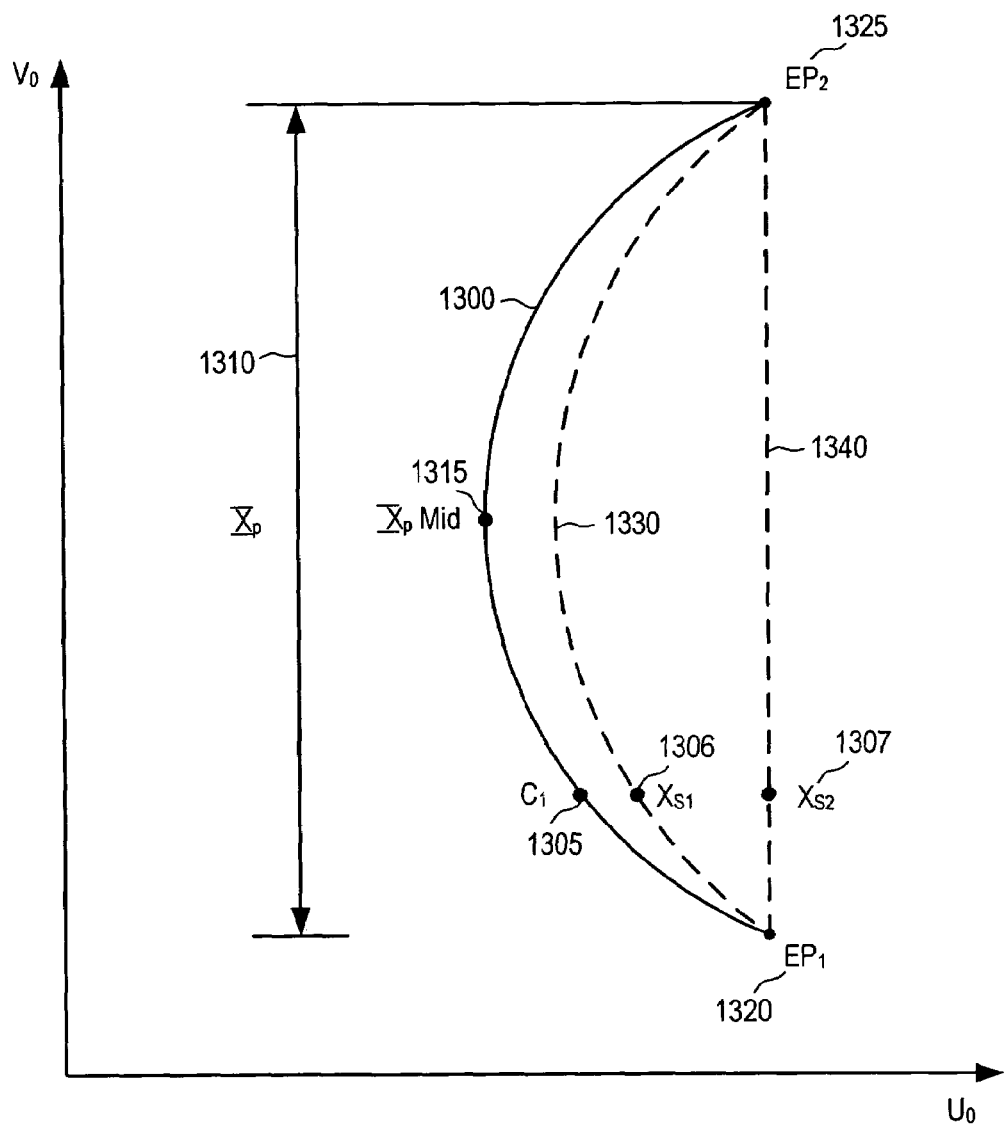
FIG. 13 is a block diagram illustrating a plurality of options for calculating starting points associated with convergence regions.

FIG. 13 illustrates methods of selecting starting points that converge fast and can be represented sparsely in memory, for instance. For an exemplary implicit curve 1300, as shown with respect to FIGS. 7A-B one exemplary starting point 1315 relates to a midpoint 1315 of the parameterization region 1310. Typically, if convergence is proven for the entire parameterization region, then data describing the endpoints $EP_1$ at 1320 and $EP_2$ at 1325 are stored along with the coordinates for the midpoint based starting point $X_p$ midpoint at 1315. First of all, the coordinate data consumes memory. Secondly, even if convergence is proven over the parameterization region 1300 from the starting point 1315, it may take an inordinate number of Newton iterations to derive most of the curve points, such as $c_1$ (e.g., 1305), that are far away from the starting point 1315.

However, approximations of the actual implicit curve 1300, such as a straight line approximation 1340 and a cubic approximation 1330, can yield starting points $X_{s1}$ 1306 and $X_{s2}$ 1307, for instance, which are much closer to the curve point (e.g., $c_1$ 1305) to be determined. Thus, according to method 1200 of FIG. 12, one form of a sparse starting point descriptor data is data describing the selection of one or more approximations (e.g., 1330 and 1340) of the implicit curve, based on which, a starting point on the approximation curve can be calculated at runtime and used to fully derive the point (e.g., $c_1$ 1305) on the curve 1300. Even though this requires additional computation during runtime, the savings in the reduced costs of memory required for storing convergence and transmitting data including starting point data may make this a tradeoff that is worthwhile for at least some graphics applications.

Exemplary Implicit Curve Approximations

Figure 14:
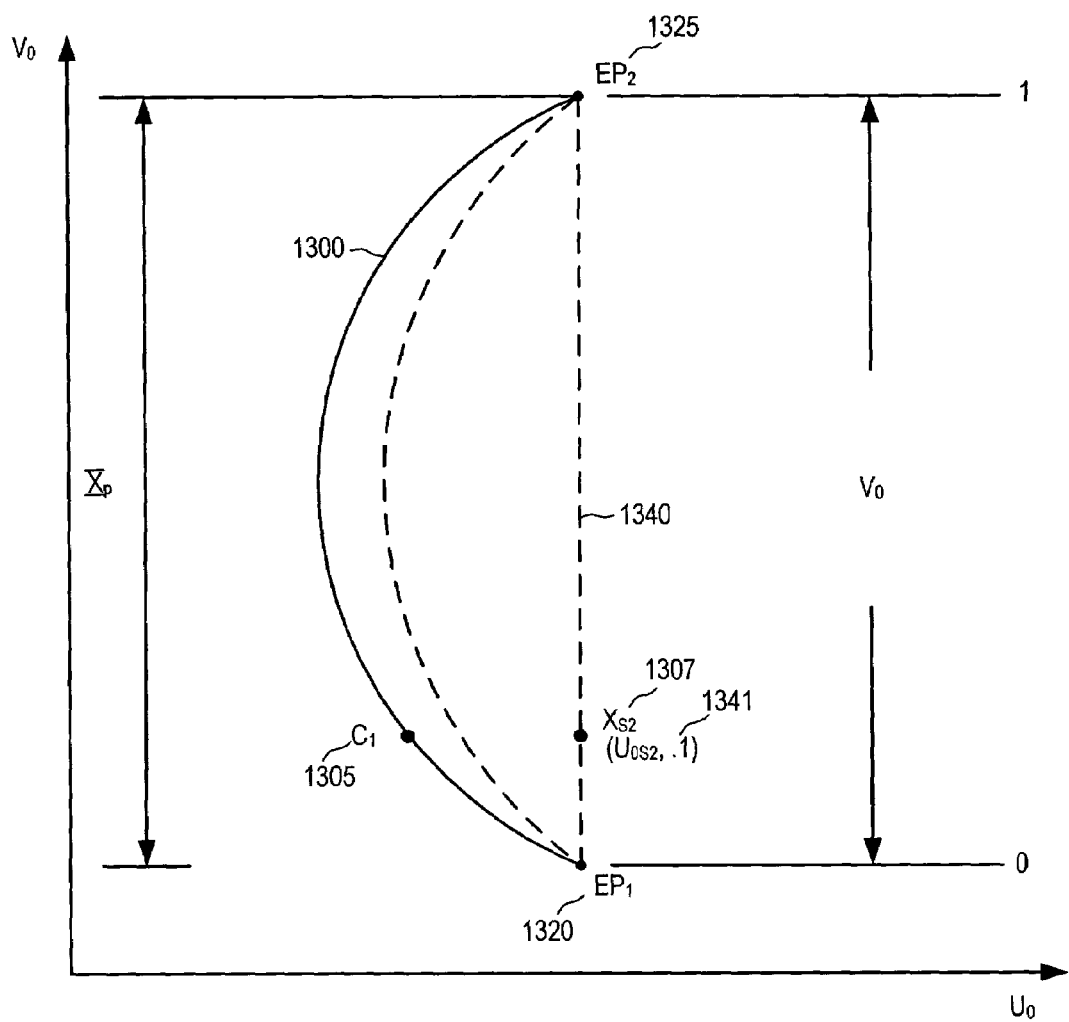
FIG. 14 is a block diagram illustrating starting points associated with convergence regions calculated based on a straight line approximation of the implicit curve.

FIG. 14 illustrates a straight line approximation 1340 to the implicit curve 1300. The example shows that in a ($u_0$, $v_0$) domain, $v_0$ has appropriately been chosen as the parameterizing variable of an implicit function defining the curve 1300. The straight line approximation 1340 of such a curve is a straight line that is interpolated between the two known endpoints $EP_1$ at 1320 and $EP_2$ at 1325. A linear interpolation function can be used to calculate any point between the two known endpoints, $EP_1$ at 1320 and $EP_2$ at 1325. Many linear interpolations techniques exist, one such linear interpolation for interpolating between two known points say, exemplary $(x_a, y_a)$ and $(x_b, y_b)$, is given as follows:

$$f(x) = \frac{x - x_b}{x_a - x_b} y_a - \frac{x - x_a}{x_a - x_b} y_b$$

Thus, at runtime, based on known values of the parameterizing variable (e.g., 1341), the starting point $X_{s2}$ at 1307 for converging to a solution of the curve point $c_1$ 1305 can be calculated and applied in a Newton iteration analysis. At least because the starting point $X_{s2}$ at 1307 is closer to the curve point of interest $c_1$ at 1305, the Newton iteration will converge faster. Also, since the starting point was calculated at runtime, any costs associated with storing and retrieving data related to starting points is avoided.

Figure 15:
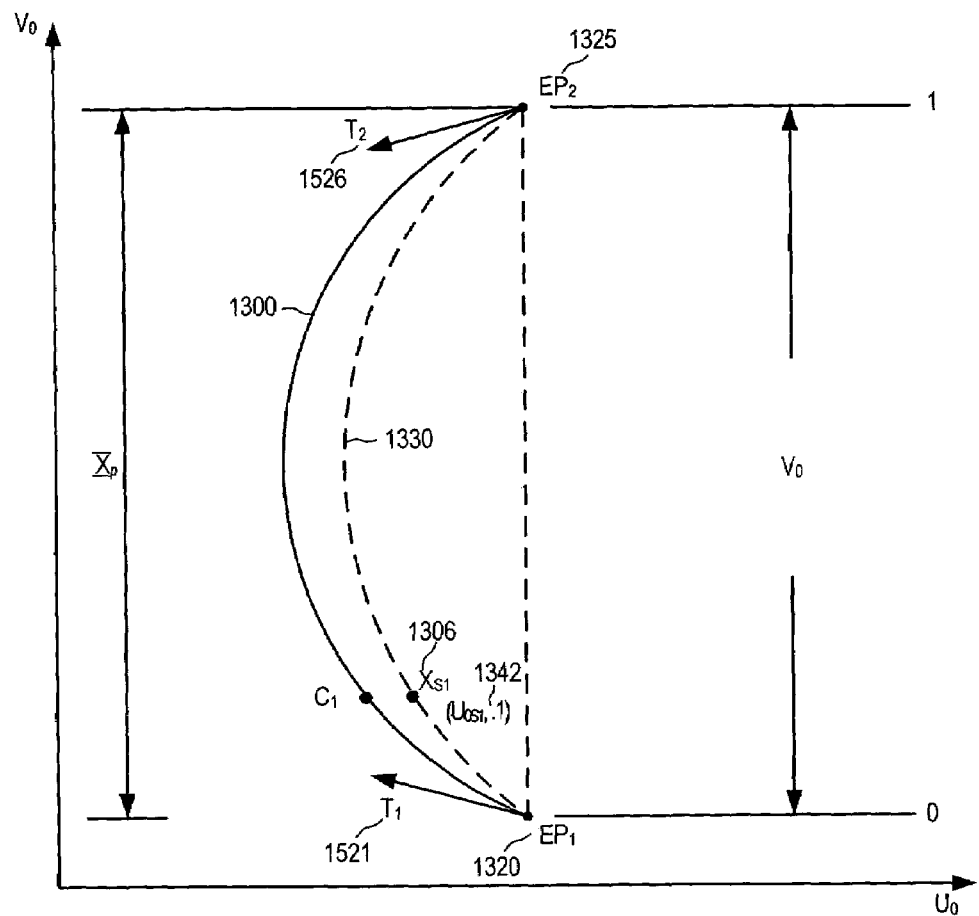
FIG. 15 is a block diagram illustrating starting points associated with convergence regions calculated based on a cubic approximation of the implicit curve.

FIG. 15 illustrates a cubic approximation 1330 for the implicit curve 1300. The cubic approximation is a curved line that is also interpolated between two known points $EP_1$ at 1320 and $EP_2$ at 1325 based on the known tangents $T_1$ at 1521 and $T_2$ at 1526. Calculating the tangents (e.g., tangents $T_1$ at 1521 and $T_2$ at 1526) at runtime is not an additional runtime computational cost since it is part of any Newton iteration analysis (e.g., FIGS. 10 and 11). The curve approximation 1330 in one embodiment can be based on a Hermite curve spline that interpolates points between two know endpoints (e.g., $EP_1$ at 1320 and $EP_2$ at 1325) and their respective curves. The Hermite form consists of two control points and two control tangents (e.g., $T_1$ at 1521 and $T_2$ at 1526), one each for each polynomial. On each subinterval, given a starting point (e.g., $EP_1$ at 1320) and an ending point (e.g., $EP_2$ at 1525) with starting tangents (e.g., $T_1$ at 1521) and ending tangent (e.g., $T_2$ at 1326), the polynomial can be defined as follows:

$$p(t)=(2t^3-3t^2+1)p_0+(t^3-2t^2+t)m_0+(-2t^3+3t^2)p_1+(t^3-t^2)m_1$$

Thus, based on the cubic curve approximation and a known value 1342 of the parameterizing variable $v_0$, the starting point 1306 can be calculated at runtime. In this example, choosing to calculate a starting point based on a cubic approximation appears to be the better choice.

Although specific examples of implicit curve approximations discussed include just the linear approximations and the cubic approximations discussed above, other forms of polynomial approximation are possible. For instance, polynomial approximations of higher order such as, quadratic or quartic polynomial approximations can also be used.

However, the choice of how best to calculate and, thereby, represent convergence regions and associated starting points is not always as clear as shown with respect to FIG. 13, for instance. In FIG. 13, the starting point $X_{s1}$ 1306 generated by the way of the cubic approximation 1330 to the implicit curve 1300 appears to be the best overall choice for converging to most points along the curve 1300 including $c_1$ at 1305. This is so at least because the starting point $X_{s1}$ at 1306 appears to be closest to the curve point $c_1$ at 1305. Thus, the cubic approximation can be chosen to calculate the starting points even though it appears that at least for some points of the curve 1300 the midpoint based starting point 1315 will be a better choice. Nevertheless, cubic approximation based starting point calculation is the better overall choice.

Figure 16:
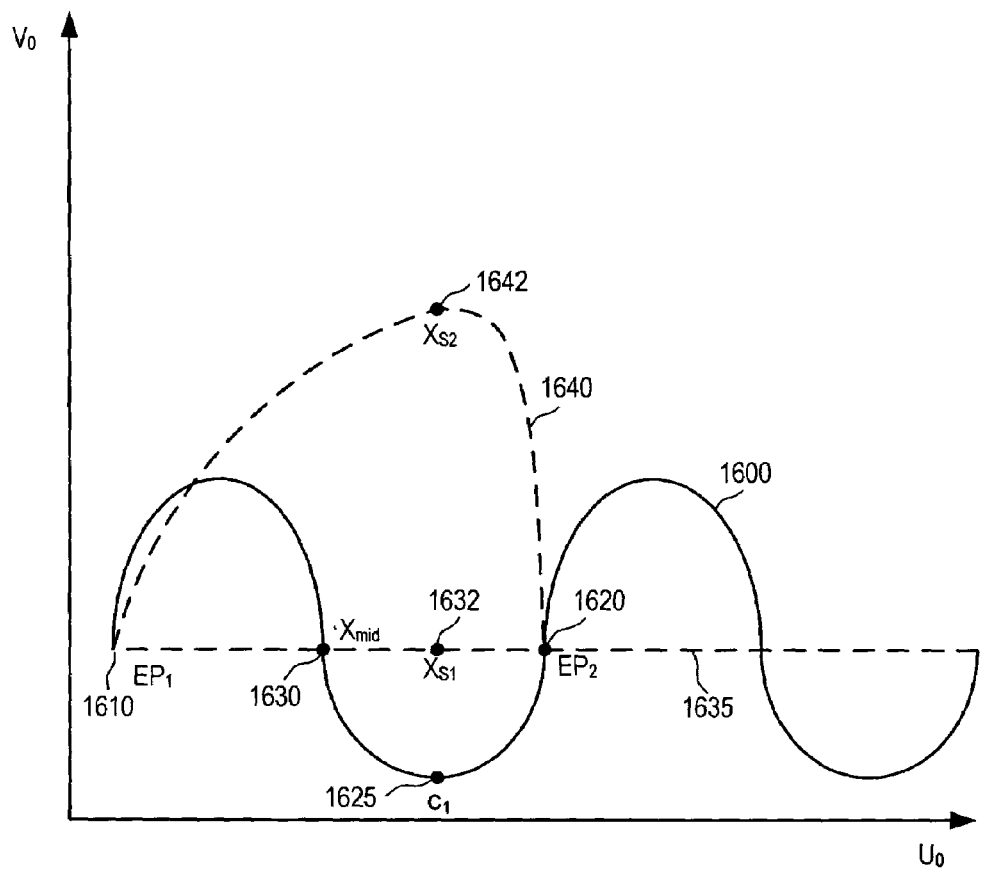
FIG. 16 is a block diagram illustrating advantages and disadvantages of selecting one or more the different types of starting points associated with the convergence regions.

Among other factors, the shape of the implicit curve (e.g., 1300) affects the choice of how best to calculate and represent starting points associated with convergence regions. FIG. 16 illustrates this reasoning. For example, the curve 1600 can be divided into several parameterization regions. For instance, in this example, with $u_0$ as the parameterizing variable, it is possible to have a parameterizing region between the endpoints $EP_1$ at 1610 and $EP_2$ at 1620. The choice of an appropriate parametering region in this example is merely illustrative and does not consider all possible criteria for how best to divide an implicit curve into parameterizing regions as described with reference to FIG. 3, for instance. Nevertheless, suppose the curve point to be evaluated $c_1$ is at 1625, the starting point $X_{mid}$ based on the parameterization region midpoint is at 1630, the starting point $X_{s1}$ calculated from the straight line approximation 1635 is at 1632, and the starting point $X_{s2}$ calculated from the cubic approximation 1640 is at 1642. In this example, calculating the starting point (e.g., $X_{s2}$ at 1642) based on the cubic approximation 1640 appears to be a poor choice. However, the starting point $X_{mid}$ at 1630 based on the midpoint of the parameterization region 1600 may be a better choice for at least some points on the curve and finally, calculating a starting point (e.g., $X_{s1}$ at 1632) based on the straight line approximation 1635 appears to be the best choice in this example. This is so not only because it yields a starting point $X_{s1}$ at 1632 closest to the curve point $c_1$ at 1625, but it also appears to yield the closer starting points for most other points on the curve 1600.

Such analysis related to determining how best to calculate starting points can be performed prior to runtime. Once this analysis is complete, some data indicating the choice of how best to calculate and represent convergence data, including starting points, can be stored so that at runtime, based on this descriptor data, a processor can calculate the starting point, or retrieve it in case of a midpoint (e.g., $X_{mid}$ at 1630), to begin the process of applying Newton iteration to converge to a point on the implicit curve (e.g., 1600).

Figure 17:
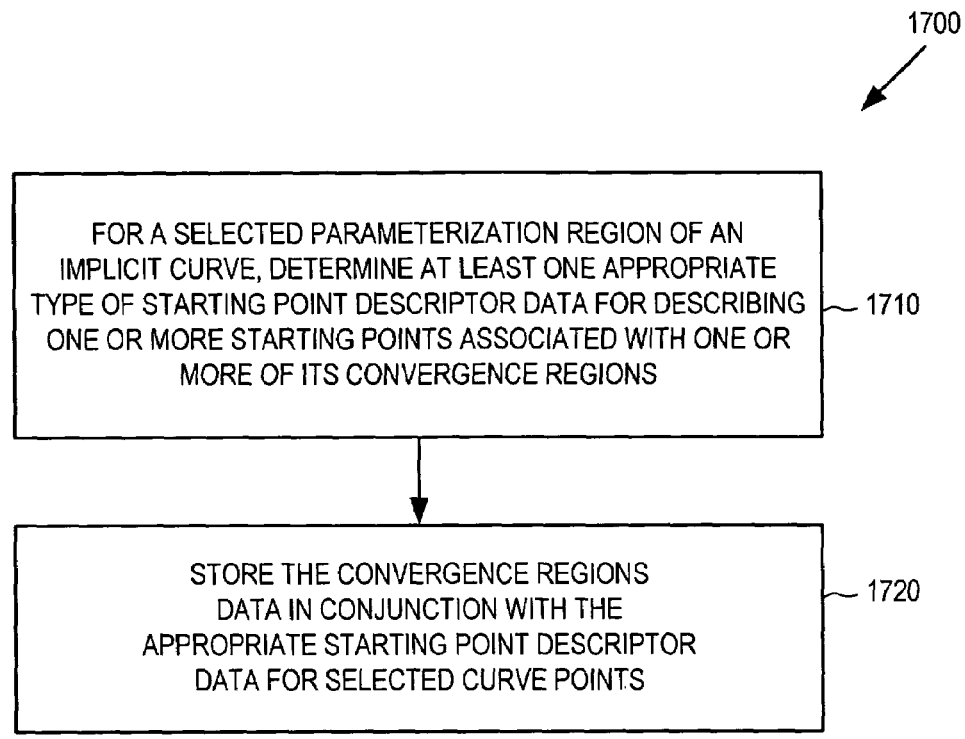
FIG. 17 is a flow diagram describing an overall method for determining an appropriate sparse form of representing starting point data.

FIG. 17 illustrates one such method 1700 of static processing of convergence data. At 1710, for a selected parameterizing region an appropriate type of starting point descriptor data including a method of determining starting point data for runtime evaluation of the implicit curve using the Newton iteration is selected. Based on this selection, starting point data descriptors are stored that indicate the selected method of calculating starting point data. In one embodiment, the choices for starting point calculation methods include, retrieving a parameterization region midpoint based starting point, calculating a starting point based on a straight-line approximation of the implicit curve between two known curve points and calculating a starting point based on a cubic approximation of the implicit curve between two known curve points. Once a choice is identified, at 1720, data descriptive of the choice of how starting points descriptor data is stored in conjunction with the data (e.g., endpoints) of the associated convergence regions.

Data indicating a choice may be in form of a bitstream. For instance, for identifying among three different exemplary choices described above, two bits would suffice. In one embodiment, a midpoint based starting point choice is indicated by a value of "00", a straight line approximation based calculation is indicated by a value of "01", and a cubic curve approximation choice is indicated by a value of "10". Thus, convergence region data, including its endpoints, can be transferred to the processor at runtime along with a choice of how its associated starting point is to be determined. If it is "00", then the processor will be operable to retrieve a stored midpoint based starting point, which adds to the cost of memory bandwidth. However, if the choice is indicated as "01" or "10", for instance, then the actual starting point will be calculated at runtime based on the appropriate implicit curve approximation. Here, in this instant case (e.g., with choices of "01" and "10"), the memory bandwidth costs of transferring coordinate data of starting points can be avoided.

Exemplary Sparse Representations of Implicit Curve Regions

Reducing costs associated with storing, transferring, and retrieving data related to regions of implicit curves, such as parameterization regions and convergence regions, for instance, is beneficial (e.g., for bandwidth constrained applications). As noted above, even with having starting points being calculated at runtime instead of being stored and later retrieved, the cost of storing and retrieving curve points, such as endpoints (e.g., $EP_1$ at 1810 and $EP_2$ at 1820 in FIG. 18), remain. In one exemplary improvement, not all data related to endpoints of the various parameterization regions need be stored and later retrieved for runtime use. For instance, just the coordinates of a first selected endpoint (e.g., $EP_1$ at 1810) may be stored along with widths (e.g., $W_0$ at 1850 and $W_1$ at 1860) of the appropriate parameterizing variables (e.g., $v_0$ for $P_1$, $u_0$ for $P_2$ and so on) indicating the parameterization regions of the curve (e.g., $P_1$, $P_2$, $P_3$ and $P_4$). At runtime, coordinates for the rest of the endpoints (e.g., $EP_2$ at 1820, $EP_3$ at 1830 and $EP_4$ at 1840) can be calculated by the way of applying Newton iterations with the known point (e.g., $EP_1$ at 1810) as the starting point. However, the entire range $W_0$ at 1850 may not converge with $EP_1$ at 1810 as the starting point. For instance, the range may need to be sub-divided further to first find a solution of an intermediate point, such as $IP_1$ at 1855 and it then may be used as a starting point to solve for $EP_2$ at 1820, for instance. This process may be continued until all the required endpoints are calculated. This does add computational complexity at runtime. However, it also substantially reduces the amount of data that needs to be stored and later retrieved at runtime. In fact, in one embodiment, all that needs to be stored is a first endpoint (e.g., $EP_1$ at 1810) and ranges (e.g., $W_0$ at 1850, $W_1$ at 1860 and so on) of the appropriate parameterizing variables for indicating the parameterization regions (e.g., $P_1$, $P_2$, $P_3$ and $P_4$). Based on this information, the rest of the needed points can be derived.

For the rest of the parameterization regions (e.g., $P_2$, $P_3$, and $P_4$ in FIG. 18) even the information regarding which are the parameterizing variables associated with the respective parameterization regions need not be stored and retrieved at runtime. Instead, it can be deciphered from the parameterization region associated with the first endpoint ($EP_1$ at 1810) because, typically, the parameterizing variables alternate between the domain variables ($u_0$, $v_0$) for consecutive parameterization regions.

Figure 19:
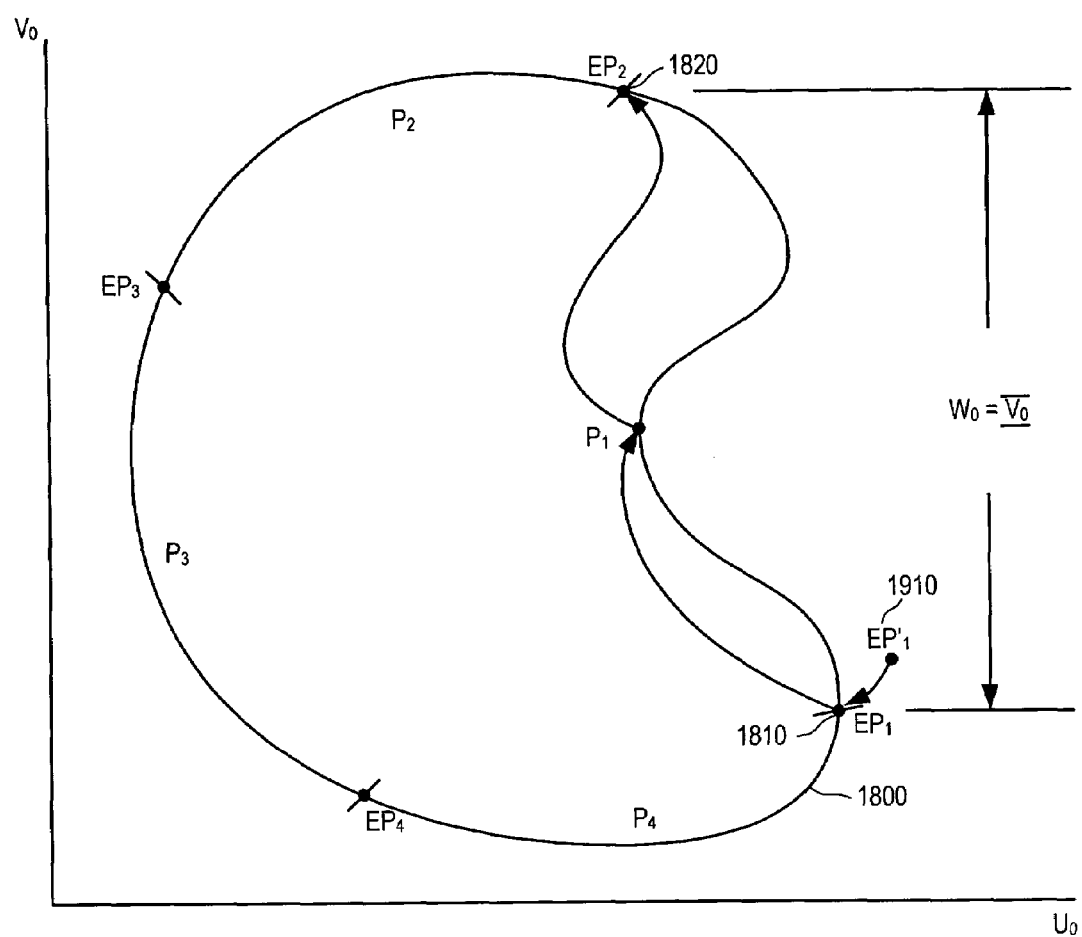
FIG. 19 is a block diagram illustrating a method of determining a sparse representation of coordinates of points related to an implicit curve by quantizing the coordinate values.

In one further improvement, costs associated with storing data related to regions of the implicit curve can be further reduced by quantizing the coordinate values of any point of relevance related to the implicit curves. FIG. 19 illustrates this further. For instance, if coordinate points of endpoints, such as $EP_1$ at 1810 and $EP_2$ at 1820, are to be stored. They need not be stored in a data structure of floating points data type. Instead, they can be quantized to an integer data type. This might result in the stored point $EP'_1$ at 1910 not being exactly on the curve 1800, but offset a bit due to any rounding needed for quantization. The exact endpoint $EP_1$ at 1810 on the curve 1800 can be derived at runtime, as needed, by applying Newton iterations with the quantized endpoint $EP'_1$ at 1910 as the starting point. Again, this does add to the computation cost at runtime. However, rounded integer data types typically require less memory than associated floating point data types, and thus, the quantization as described above can reduce the costs associated with storing and retrieving coordinate data. This trade-off may be worthwhile for some memory constrained applications.

Figure 18:
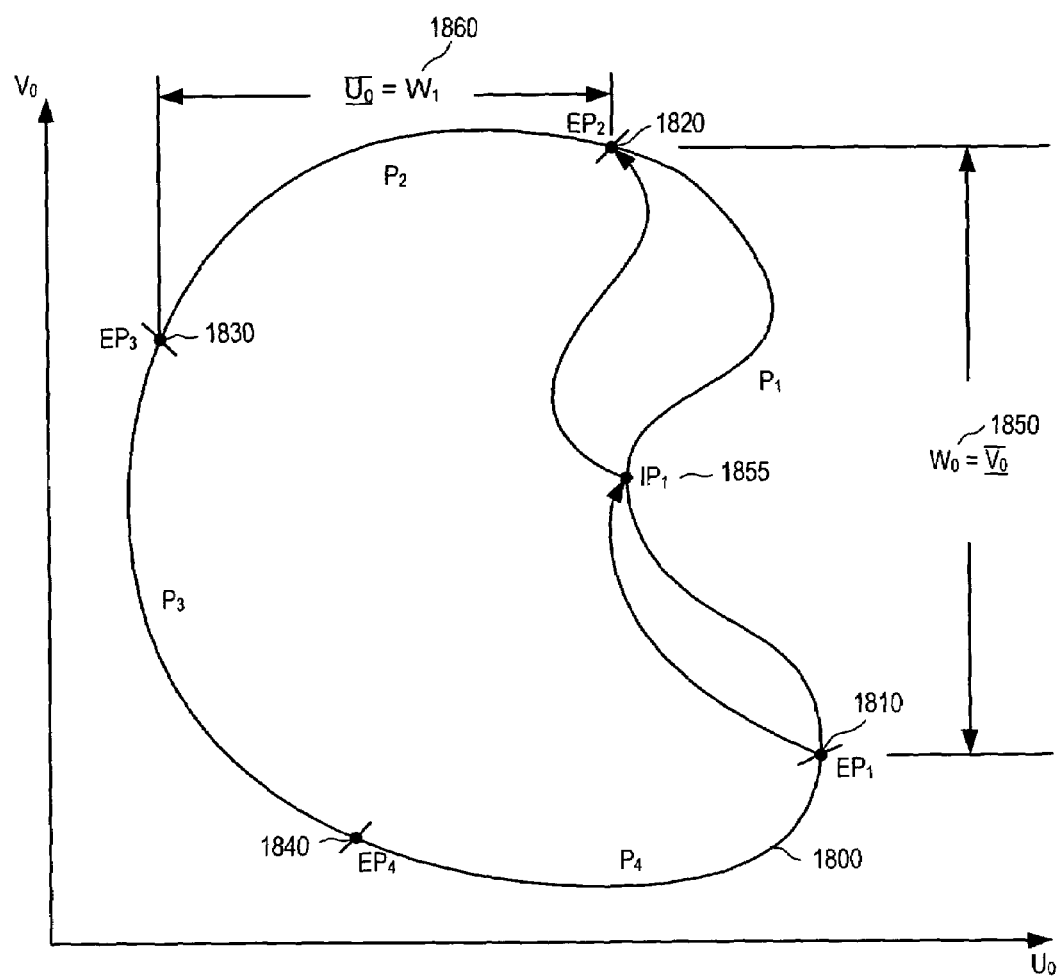
FIG. 18 is a block diagram illustrating a method of determining a sparse representation of convergence regions by representing just one of the associated endpoints.

The memory saving features described, with reference to FIG. 18 and FIG. 19 above, can be used in combination with each other and in combination with any of the other methods described herein with respect to deriving and representing implicit curves. For instance, the memory costs for storing information related to parameterization region 1800 in FIG. 18 can be reduced by orders of magnitude, if the entire curve 1800 can be represented in terms of a selected endpoint (e.g., as $EP_1$ at 1810 and ranges of the appropriate parameterizing variables) by quantizing the coordinates associated therewith. The rest of the information can be derived at runtime based on this sparse information. This can present an enormous advantage to applications within environments where bandwidth and memory are not only expensive but, in fact, may be unavailable.

Exemplary Computing Environment

Figure 20:
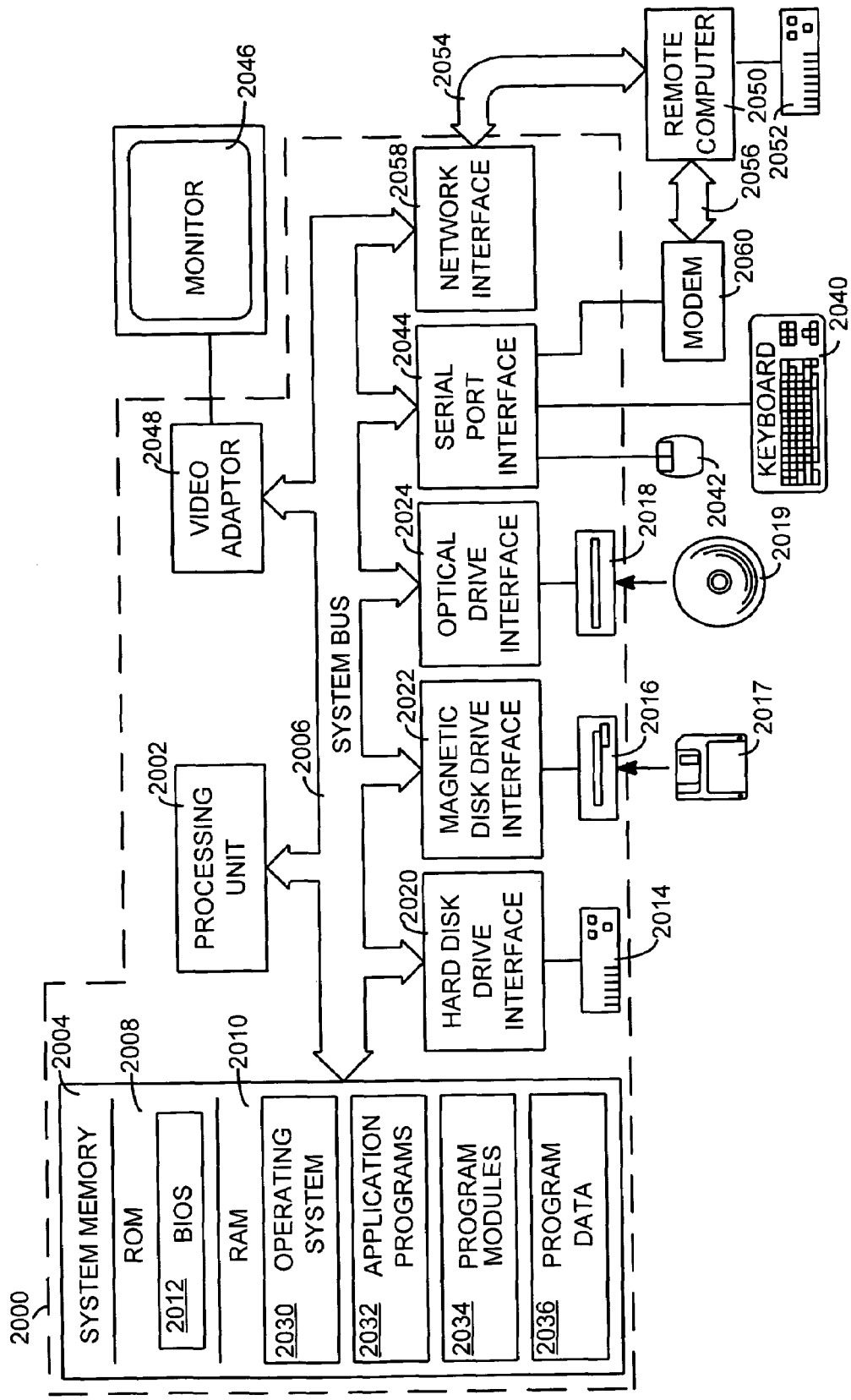
FIG. 20 is a diagram depicting a general-purpose computing device constituting an exemplary system for implementing the disclosed technology.

FIG. 20 and the following discussion are intended to provide a brief, general description of an exemplary computing environment in which the disclosed technology may be implemented. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 20, an exemplary system for implementing the disclosed technology includes a general purpose computing device in the form of a conventional PC 2000, including a processing unit 2002, a system memory 2004, and a system bus 2006 that couples various system components including the system memory 2004 to the processing unit 2002. The system bus 2006 may be any of several types of bus structures including a memory bus or memory controller, a peripheral bus, and a local bus using any of a variety of bus architectures. The system memory 2004 includes read only memory (ROM) 2008 and random access memory (RAM) 2010. A basic input/output system (BIOS) 2012, containing the basic routines that help with the transfer of information between elements within the PC 2000, is stored in ROM 2008.

The PC 2000 further includes a hard disk drive 2014 for reading from and writing to a hard disk (not shown), a magnetic disk drive 2016 for reading from or writing to a removable magnetic disk 2017, and an optical disk drive 2018 for reading from or writing to a removable optical disk 2019 (such as a CD-ROM or other optical media). The hard disk drive 2014, magnetic disk drive 2016, and optical disk drive 2018 are connected to the system bus 2006 by a hard disk drive interface 2020, a magnetic disk drive interface 2022, and an optical drive interface 2024, respectively. The drives and their associated tangible computer-readable storage media provide nonvolatile storage of computer-readable instructions, data structures, program modules, and other data for the PC 2000. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk 2014, magnetic disk 2017, optical disk 2019, ROM 2008, or RAM 2010, including an operating system 2030, one or more application programs 2032, other program modules 2034, and program data 2036. For instance, many of the methods discussed herein that are related to "Representing Implicit Curves of Procedural Geometric Surfaces" can be store as instructions in program modules 2034.

A user may enter commands and information into the PC 2000 through input devices such as a keyboard 2040 and pointing device 2042 (such as a mouse). Other input devices (not shown) may include a digital camera, microphone, joystick, game pad, satellite dish, scanner, or the like. These and other input devices are often connected to the processing unit 2002 through a serial port interface 2044 that is coupled to the system bus 2006, but may be connected by other interfaces such as a parallel port, game port, or universal serial bus (USB). A monitor 2046 or other type of display device is also connected to the system bus 2006 via an interface, such as a video adapter 2048. Other peripheral output devices, such as speakers and printers (not shown), may be included.

The PC 2000 may operate in a networked environment using logical connections to one or more remote computers, such as a remote computer 2050. The remote computer 2050 may be another PC, a server, a router, a network PC, or a peer device or other common network node, and typically includes many or all of the elements described above relative to the PC 2000, although only a memory storage device 2052 has been illustrated in FIG. 20. The logical connections depicted in FIG. 20 include a local area network (LAN) 2054 and a wide area network (WAN) 2056. Such networking environments are commonplace in offices, enterprise-wide computer networks, intranets, and the Internet.

When used in a LAN networking environment, the PC 2000 is connected to the LAN 2054 through a network interface 2058. When used in a WAN networking environment, the PC 2000 typically includes a modem 2060 or other means for establishing communications over the WAN 2056, such as the Internet. The modem 2060, which may be internal or external, is connected to the system bus 2006 via the serial port interface 2044. In a networked environment, program modules depicted relative to the personal computer 2000, or portions thereof, may be stored in the remote memory storage device. The network connections shown are exemplary, and other means of establishing a communications link between the computers may be used.

Having described and illustrated the principles of the invention with reference to the illustrated embodiments, it will be recognized that the illustrated embodiments can be modified in arrangement and detail without departing from such principles.

For instance, many of the examples used above describe algorithms for determining implicit curves of intersection of two or more procedural surfaces with known functions. However, the principles described herein may be applied to any implicitly defined functions. For instance, these same principles may be applied to motion in a machine with different functions defining different motions of different parts of the machine, which may need to be synchronized.

Furthermore, many of the examples illustrate functions wherein parametrization functions show a $R^4 \rightarrow R^3$ domain to range transformation indicating that a single parameterizing variable parameterizes the expression of the dependent variables. However, other transformations are possible. For instance, two parameterizing variables may be chosen to parameterize the expression of the rest of the variables as dependent variables.

In addition to representing implicit curves, the principles described herein may be applied equally effectively to calculate compact piecewise parametric inverses of arbitrary functions and to compute exact efficient representations of arbitrary differentiable functions.

Furthermore, elements of the illustrated embodiment shown in software may be implemented in hardware and vice-versa. Also, the technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We therefore claim as our invention all subject matter that comes within the scope and spirit of these claims.

Also, the alternatives specifically addressed in this sections are merely exemplary and do not constitute all possible alternatives to the embodiments described herein.

I claim:

1. A computer implemented method for determining at least some coordinates of at least some points on an implicit curve resulting from an intersection of a plurality of graphical objects, the method comprising:
   determining, by a computer, one or more parameterization regions of the implicit curve resulting from the intersection;
   determining, by the computer, one or more convergence regions of the one or more parameterization regions, wherein the determining one or more convergence regions comprises (a) and (b):
   (a) testing for convergence for a given parameterization region via a Kantorovich condition while adjusting the given parameterization region by Newton steps;
   (b) responsive to determining that the given parameterization region does not converge after adjusting the given parameterization region via Newton steps, subdividing the given parameterization region into a plurality of subdivisions and separately testing for convergence of the plurality of subdivisions;
   receiving, by the computer, a sparse parameterized representation of at least a portion of the implicit curve, the representation comprising sparse convergence region descriptor data for describing the one or more convergence regions and sparse starting point descriptor data for deriving starting points associated with the one or more convergence regions;
   at runtime, based at least on the sparse starting point descriptor data of the starting points associated with the one or more convergence regions, deriving, by the computer, the coordinates of at least some of the starting points associated with the one or more convergence regions; and
   applying, by the computer, Newton iteration starting from the derived coordinates of the at least some of the starting points to determine at least some coordinates of one or more points on the implicit curve;
   wherein applying Newton iteration starting from the derived coordinates of the at least some of the starting points is guaranteed to converge to a solution.

2. The computer implemented method of claim 1, wherein the sparse starting point descriptor data for deriving starting points associated with the one or more convergence regions comprises data indicative of selection of a method for deriving the starting points at runtime.

3. The computer implemented method of claim 2, wherein the method for deriving the coordinates of at least some of the starting points at runtime comprises retrieving stored coordinates of one or more midpoints of one or more parameterization regions of the implicit curve.

4. The computer implemented method of claim 2, wherein the method for deriving the coordinates of at least some of the starting points at runtime comprises calculating the coordinates of the starting points based on a straight line approximation of the implicit curve.

5. The computer implemented method of claim 2, wherein the method for deriving the coordinates of at least some of the starting points at runtime comprises calculating the coordinates of the starting points based on a cubic approximation of the implicit curve.

6. The method of claim 5, wherein the cubic approximation of the implicit curve is a Hermite curve approximation.

7. The method of claim 1, wherein the sparse convergence region descriptor data for describing one or more convergence regions of the implicit curve comprises coordinates of just one known endpoint of one of the one or more convergence regions.

8. The method of claim 7, further comprising: calculating at runtime, endpoints of at least one of the one or more convergence regions by applying Newton iterations starting from the one known endpoint.

9. The method of claim 7, wherein the one known endpoint is represented in a quantized integer data type.

10. The method of claim 1, wherein the sparse convergence region descriptor data for describing the one or more convergence regions of the implicit curve comprises at least one endpoint of at least one of the one or more convergence regions represented in quantized integer data types and wherein coordinates of the at least one endpoint are calculated at runtime by applying Newton iterations starting from the quantized representation of the at least one endpoint.

11. A computer implemented method for rendering an implicit curve of intersection related to a plurality of graphical objects by generating a parameterized representation of the implicit curve of intersection, the method comprising:

determining one or more parameterization regions of the implicit curve of intersection;

applying, by a computer, a recursive intervalized super convergence test to determine one or more convergence regions of the one or more parameterization regions, comprising, testing for convergence for a given parameterization region;

if the given parameterization region does not converge, then iteratively subdividing the parameterization region into ranges, if a Kantorovich condition holds not true for a given range within the parameterization region then applying the Kantorovich condition iteratively to the given range, else subdividing the given range on the implicit curve using a Newtonian iterative step;

storing a parameterized representation of at least a portion of the implicit curve of intersection, the representation comprising convergence region descriptor data for describing the one or more convergence regions and sparse starting point descriptor data for determining starting points associated with the one or more convergence regions to create a compact representation of the implicit curve, wherein Newton iteration from a starting point derived from the sparse starting point descriptor data will converge to a solution;

at runtime, using the compact representation of the implicit curve, based at least on the sparse starting point descriptor data of the starting points associated with the one or more convergence regions in the compact representation, determining coordinates of the starting points associated with the one or more convergence regions; and applying Newton iteration starting from the starting points to determine at least some coordinates of one or more points of the implicit curve of intersection for rendering at least some of the one or more points of the implicit curve of intersection on a display.

12. The method of claim 11, wherein the implicit curve is derived by a constructive solid geometry operation involving a plurality of geometric surfaces.

13. The method of claim 11, wherein the sparse starting point descriptor data for determining starting points associated with the one or more convergence regions comprises data indicative of a method for runtime determination of the starting points associated with the one or more convergence regions.

14. The method of claim 11, wherein the range comprises a range of the parameterization region and a corresponding set of starting values.

15. One or more computer-readable storage media containing instructions which, when executed by a computer, cause the computer to perform a method, the method comprising:

determining, by the computer, one or more parameterization regions of the implicit curve resulting from the intersection;

determining, by the computer, one or more convergence regions of the one or more parameterization regions, wherein the determining one or more convergence regions comprises (a) and (b):

(a) testing for convergence for a given parameterization region via a Kantorovich condition while adjusting the given parameterization region by Newton steps;

(b) responsive to determining that the given parameterization region does not converge after adjusting the given parameterization region via Newton steps, subdividing the given parameterization region into a plurality of subdivisions and separately testing for convergence of the plurality of subdivisions;

receiving, by the computer, a sparse parameterized representation of at least a portion of the implicit curve, the representation comprising sparse convergence region descriptor data for describing the one or more convergence regions and sparse starting point descriptor data for deriving starting points associated with the one or more convergence regions;

at runtime, based at least on the sparse starting point descriptor data of the starting points associated with the one or more convergence regions, deriving, by the computer, the coordinates of at least some of the starting points associated with the one or more convergence regions; and applying, by the computer, Newton iteration starting from the derived coordinates of the at least some of the starting points to determine at least some coordinates of one or more points on the implicit curve;

wherein applying Newton iteration starting from the derived coordinates of the at least some of the starting points is guaranteed to converge to a solution.

16. The one or more computer-readable storage media of claim 15, wherein the sparse starting point descriptor data for deriving starting points associated with the one or more convergence regions comprises data indicative of selection of a method for deriving the starting points at runtime.

17. The one or more computer-readable storage media of claim 15, wherein the sparse convergence region descriptor data for describing one or more convergence regions of. the implicit curve comprises coordinates of just one known endpoint of one of the one or more convergence regions.

18. The one or more computer-readable storage media of claim 15, wherein the sparse convergence region descriptor data for describing the one or more convergence regions of the implicit curve comprises at least one endpoint of at least one of the one or more convergence regions represented in quantized integer data types and wherein coordinates of the at least one endpoint are calculated at runtime by applying Newton iterations starting from the quantized representation of the at least one endpoint.

19. The one or more computer-readable storage media of claim 15, wherein the implicit curve is derived by a constructive solid geometry operation involving a plurality of geometric surfaces.

20. A system comprising:

a processor; and one or more computer-readable storage media containing instructions which, when executed by the processor, cause the processor to perform a method, the method comprising, determining, by the processor, one or more parameterization regions of the implicit curve resulting from the intersection, determining, by the processor, one or more convergence regions of the one or more parameterization regions, wherein the determining one or more convergence regions comprises (a) and (b), (a) testing for convergence for a given parameterization region via a Kantorovich condition while adjusting the given parameterization region by Newton steps, (b) responsive to determining that the given parameterization region does not converge after adjusting the given parameterization region via Newton steps, subdividing the given parameterization region into a plurality of subdivisions and separately testing for convergence of the plurality of subdivisions, receiving, by the processor, a sparse parameterized representation of at least a portion of the implicit curve, the representation comprising sparse convergence region descriptor data for describing the one or more convergence regions and sparse starting point descriptor data for deriving starting points associated with the one or more convergence regions, at runtime, based at least on the sparse starting point descriptor data of the starting points associated with the one or more convergence regions, deriving, by the processor, the coordinates of at least some of the starting points associated with the one or more convergence regions, and applying, by the processor, Newton iteration starting from the derived coordinates of the at least some of the starting points to determine at least some coordinates of one or more points on the implicit curve, wherein applying Newton iteration starting from the derived coordinates of the at least some of the starting points is guaranteed to converge to a solution.

* * * * *

UNITED STATES PATENT AND TRADEMARK OFFICE
CERTIFICATE OF CORRECTION

PATENT NO. : 7,671,860 B2
APPLICATION NO. : 11/213553
DATED : March 2, 2010
INVENTOR(S) : Brian K. Guenter Page 1 of 1

It is certified that error appears in the above-identified patent and that said Letters Patent is hereby corrected as shown below:

In column 20, line 67, in Claim 17, delete "of." and insert -- of --, therefor.

Signed and Sealed this
Fifteenth Day of February, 2011

David J. Kappos
*Director of the United States Patent and Trademark Office*